(12) United States Patent
Seki et al.

(10) Patent No.: US 6,657,582 B2
(45) Date of Patent: Dec. 2, 2003

(54) RADAR APPARATUS CAPABLE OF MEASURING A PLURALITY OF OBJECTS THAT ARE IN CLOSE PROXIMITY

(75) Inventors: Tetsuo Seki, Kawasaki (JP); Osamu Isaji, Kobe (JP)

(73) Assignees: Fujitsu Limited, Kawasaki (JP); Fujitsu Ten Limited, Kobe (JP)

( * ) Notice: Subject to any disclaimer, the term of this patent is extended or adjusted under 35 U.S.C. 154(b) by 0 days.

(21) Appl. No.: 10/109,652

(22) Filed: Apr. 1, 2002

(65) Prior Publication Data

US 2003/0112173 A1 Jun. 19, 2003

(30) Foreign Application Priority Data

Dec. 13, 2001 (JP) ........................................ 2001-379852

(51) Int. Cl.⁷ ............................................... G01S 13/93
(52) U.S. Cl. .................... 342/70; 342/107; 342/112; 342/128; 342/129; 342/130
(58) Field of Search ............................ 342/70–72, 107, 342/112, 128–130

(56) References Cited

U.S. PATENT DOCUMENTS

| | | | | |
|---|---|---|---|---|
| 5,625,362 A | * | 4/1997 | Richardson | 342/70 |
| 5,731,778 A | * | 3/1998 | Nakatani et al. | 342/70 |
| 5,751,240 A | * | 5/1998 | Fujita et al. | 342/70 |
| 5,905,458 A | * | 5/1999 | Ashihara | 342/70 |
| 5,963,163 A | * | 10/1999 | Kemkemian et al. | 342/109 |
| 6,097,331 A | * | 8/2000 | Matsugatani et al. | 342/70 |
| 6,137,435 A | * | 10/2000 | Kai | 342/70 |
| 6,249,243 B1 | * | 6/2001 | Takagi | 342/70 |
| RE37,725 E | * | 6/2002 | Yamada | 342/72 |

FOREIGN PATENT DOCUMENTS

JP  4-343084  11/1992

* cited by examiner

*Primary Examiner*—Thomas H. Tarcza
*Assistant Examiner*—Isam Alsomiri
(74) *Attorney, Agent, or Firm*—Staas & Halsey LLP

(57) ABSTRACT

As to a beat signal of a received wave, for instance, a plurality of FFT-based frequency spectra of every FM rise zone are accumulated in an accumulation unit. A judgment unit judges a valley section from the plurality of frequency spectra accumulated. A peak frequency extraction unit acquires, as beat frequencies of different targets, respective beat frequencies of peak sections located at both sides of the valley sections judged.

10 Claims, 22 Drawing Sheets

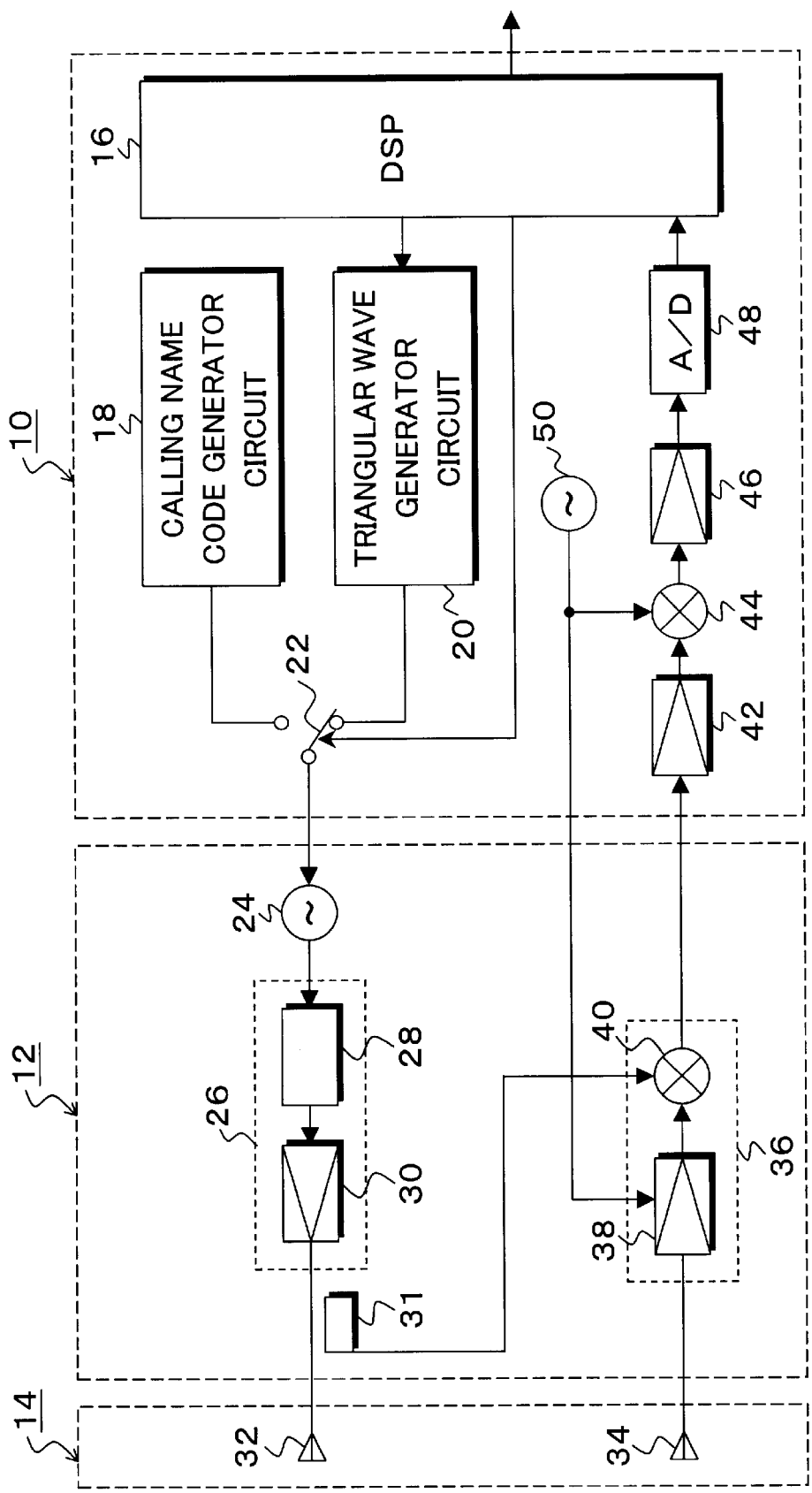

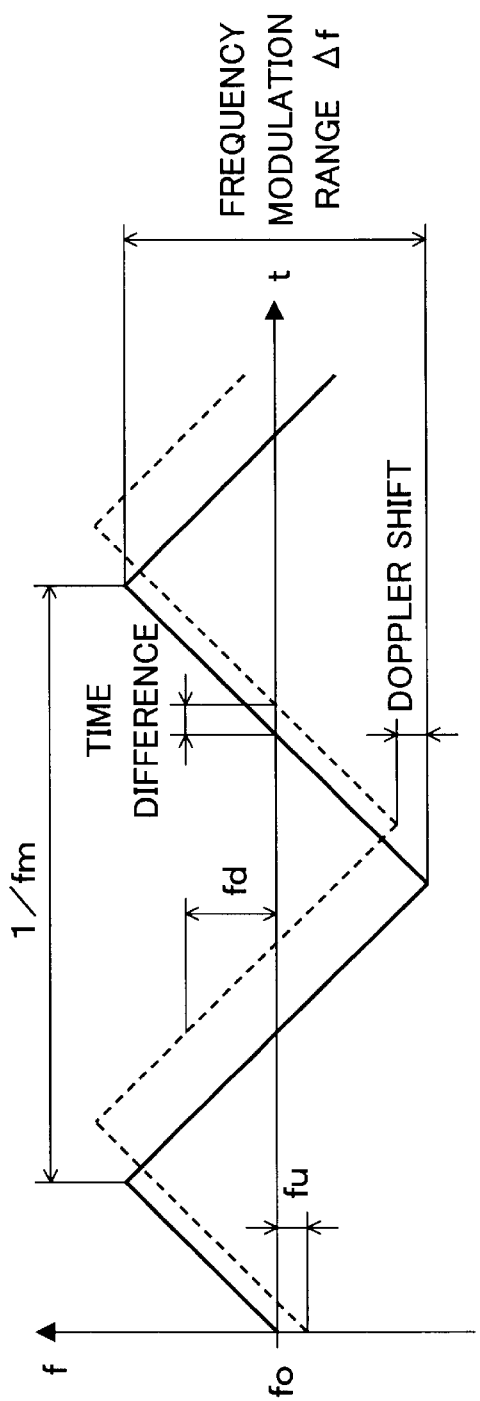
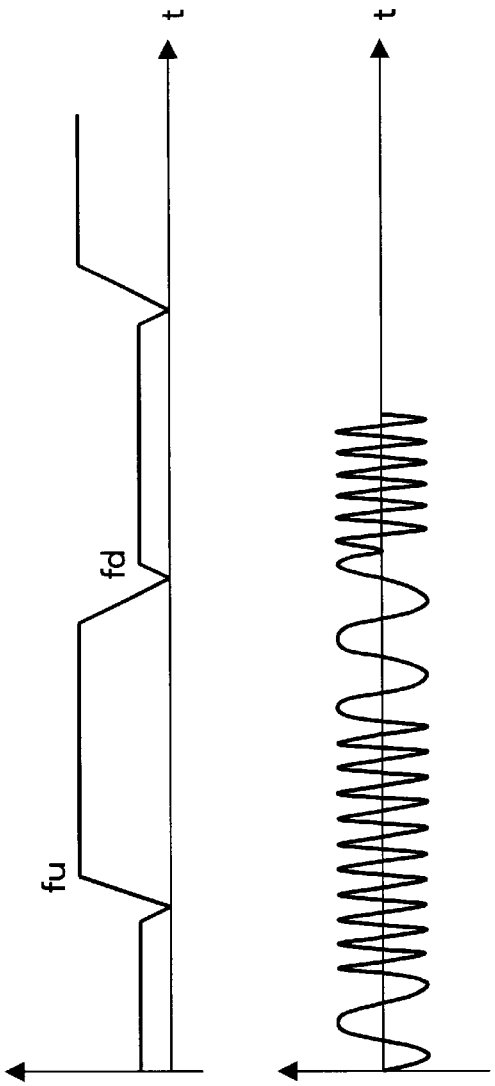
FIG. 2A
FIG. 2B BEAT FREQUENCY
FIG. 2C BEAT SIGNAL

FIG. 15B ACCUMULATION TIMING

RADAR APPARATUS CAPABLE OF MEASURING A PLURALITY OF OBJECTS THAT ARE IN CLOSE PROXIMITY

BACKGROUND OF THE INVENTION

1. Field of the Invention

The present invention relates generally to a radar apparatus to measure the distance to a target object and the relative speed thereto, a signal processing method and a program, and more particularly to a radar apparatus capable of accurately measuring a plurality of objects that are present in proximity, a signal processing method and a program.

2. Description of the Related Arts

In recent years, an ACC (Adaptive Cruise Control) system to control the accelerator or brake of a vehicle running on an expressway has being thought about, in the field of ITS (Intelligent Transport Systems). What is indispensable to this ACC system is a sensor to measure the distance of the vehicle running in the front and relative speed. As this sensor, millimeter wave radar of a FM-CW (Frequency-Modulated Continuous Waves) type holds great promise. The FM-CW millimeter wave radar generates beat signal from the difference between the frequency modulated sending wave and wave received from the target object (hereinafter to be referred to as "target"), performs FFT processing (Fast Fourier Transform processing), separating the rise zone and the fall zone of FM frequency, and extracts individual beat frequency of both of the two zones to be peak level. And from the two beat frequencies extracted from the individual zones, the radar determines beat frequency of the target by pairing processing, so as to find the distance and relative speed of the target. Also, as the distance and relative speed of the target can be acquired for every antenna angle, when a radar antenna is allowed to scan in a horizontal direction, the target can be detected two-dimensionally.

However, the FM-CW millimeter wave radar has a problem that the separation of a plurality of targets in proximity would be difficult. In order to separate targets in distance direction, frequency contained in beat signal must be separated and extracted. When a plurality of targets present in proximity, a plurality of signals may appear in nearby beat frequency. To separate a plurality of beat frequencies, the separation can be made with a condition that there is a valley between peak-to-peak of the frequency spectrum acquired by the FFT processing. However, when beat frequencies are in close positions, as peaks of the frequency spectrum are synthesized, overlaid a peak on another peak, peaks cannot be separated. The limitation of separating peaks is determined depending on the number of points of the FFT or window function, but especially at the boundary between availability and unavailability of separation, the boundary between availability and unavailability can become unstable caused by phase difference of signals. When difference in frequencies of a plurality of beat signals becomes the boundary between availability and unavailability of separation, the reflected waves from a plurality of targets cause a synthesizing method of signals to change corresponding to the difference in the individual phases, and the level of the valley between peak-to-peak significantly changes. Therefore, the boundary between availability and unavailability of peak separation can change depending on phase difference, thereby leading up to unstable separation or likely resulting in erroneous pairing to pair beat frequencies of different targets together. Similarly, when the antenna is scanning in a horizontal direction, there is a problem that can lead to erroneous pairing, if an attempt is made to separate targets located at the same distance and at nearby angles, because the boundary between availability and unavailability of separation would change depending on the difference in the individual phases.

SUMMARY OF THE INVENTION

According to the present invention there are provided a radar apparatus, a signal processing method and a program, ensuring that the separation of a plurality of targets present in proximity is made more securely.

(Antenna Non-Scanning Type Radar Apparatus)

A first aspect of the present invention provides a radar apparatus comprising a sending/receiving unit which sends from its antenna a sending signal which has been frequency modulated (FM) by a triangular wave signal, the sending/receiving unit mixing a signal received from the antenna and a local signal branched off from the sending signal, to thereby generate a beat signal; a frequency analyzing unit which analyzes (by FFT) the frequency of the beat signal for each rise zone and each fall zone of the frequency modulated by the triangular wave signal; an accumulation unit which accumulates a plurality of frequency spectra by frequency analysis at least for each the rise zone; a judgment unit which judges a valley (characteristic section) from the plurality of frequency spectra accumulated in the accumulation unit; a peak frequency extraction unit which acquires, as beat frequencies of different targets, respective beat frequencies of peak sections located at both sides of the characteristic section judged by the judgment unit; and an operation unit which calculates the distance to a target and the relative speed thereto, based on the beat frequencies.

According to considerations of the inventor of the present invention, each of the reflected waves from a plurality of targets has different phase, and if the radar or the target is traveling, phase will change at random, in the light of the wavelength of millimeter wave. Also, as to the reflected waves from the plurality of targets, the synthesizing method of signals would change depending on the individual phase difference, so, if beat frequencies to form a plurality of peaks are close, the level between peak-to-peak will change considerably. Therefore, the present invention is intending to perform the separation of targets present in proximity more securely, accumulating the distribution of frequency spectrum, that is the result of analyzing frequencies where the overlapping state of peak-to-peak changes caused by phase changing at random, performing the accumulation work a plurality of times repeatedly in time sequence, and from these accumulated distributions, judging the frequency of dropping sections with large level difference to be a featuring section, and setting each of two peaks at the front and back of the featuring section as beat frequency of the target. Here, an accumulation unit, judgment unit and a peak frequency extraction unit can be designed to perform processing of both of the FM rise zone and FM fall zone, so as to further make sure the separation of targets.

A second aspect of the present invention provides a signal processing method for the FM=CW radar. The method comprises a sending/receiving step which includes sending from an antenna a sending signal which has been frequency modulated by a triangular wave signal, and mixing a signal received from the antenna and a local signal branched off from the sending signal, to thereby generate a beat signal; a frequency analysis step which includes analyzing (by FFT) the frequency of the beat signal for each rise zone and each fall zone of the frequency modulated by the triangular wave signal; an accumulation step which includes accumulating a plurality of frequency spectra by analyzing the frequency at least for each the rise zone; a judgment step which includes judging a characteristic section from the plurality of frequency spectra accumulated; a peak frequency extraction step which includes acquiring, as beat frequencies of different targets, respective beat frequencies of peak sections located at the both sides of the characteristic section judged; and an operation step which includes calculating the distance to a target and the relative speed thereto, based on the beat frequencies. Here, the accumulation step, judgment step and the peak frequency extraction step may be executed as to both of the rise zone and the fall zone.

A third aspect of the present invention provides a program executed by a computer (e.g., DSP) mounted on the radar apparatus. The program causes a computer mounted on a radar apparatus to execute a frequency analysis step which includes inputting a beat signal acquired by sending from an antenna a sending signal which has been frequency modulated by a triangular wave signal, and by mixing a signal received from the antenna and a local signal branched off from the sending signal, and analyzing (by FFT) the frequency of the beat signal for each rise zone and each fall zone of the frequency modulated by the triangular wave signal; an accumulation step which includes accumulating a plurality of frequency spectra by analyzing the frequency at least for each the rise zone; a judgment step which includes judging a characteristic section from the plurality of frequency spectra accumulated; a peak frequency extraction step which includes acquiring, as beat frequencies of different targets, respective beat frequencies of peak sections located at the both sides of the characteristic section judged; and an operation step which includes calculating the distance to a target and the relative speed thereto, based on the beat frequencies.

(Antenna Scanning Type Radar Apparatus)

According to considerations of the inventor of the present invention, in the radar apparatus scanning an antenna in a horizontal direction, when a plurality of targets at the same distance are located at near angles viewed from the antenna, there is the angular range where availability or unavailability of separation would be unstable depending on phase differences of a plurality of received waves, and phase would change at random, if the radar or the target is traveling.

Thus, a fourth aspect of the present invention provides a radar apparatus comprising an antenna which is mechanically scanned within a predetermined angular range; a sending/receiving unit which sends from the antenna a sending signal which has been frequency modulated by a sending triangular wave signal, the sending/receiving unit mixing a signal received from the antenna and a local signal branched off from the sending signal, to thereby generate a beat signal; a frequency analyzing unit which analyzes the frequency of the beat signal for each rise zone and each fall zone of the frequency modulated by the triangular wave signal; an accumulation unit which accumulates a plurality of changes in spectral value of a specific beat frequency acquired by the frequency analyzing unit, corresponding to changes in the antenna scanning angle, for each different antenna scanning angle within a predetermined angular range; a judgment unit which judges a characteristic section from changes in spectral value corresponding to a plurality of antenna scanning angles accumulated in the accumulation unit; a peak frequency extraction unit which acquires, as beat frequencies of targets present in different directions of scanning angle, spectral values of peak sections located at both sides of the characteristic section judged by the judgment unit; and an operation unit which calculates the distance to a target and the relative speed thereto correlated with the antenna angle, based on the beat frequencies. In this manner, as to the spectral value of the beat frequencies extracted from a plurality of targets located at the same distance and in different directions, the present invention accumulates distributions showing changes in the peak-to-peak overlapping state in the directions of the individual target caused by phase changing at random, a plurality of times in time sequence, and judges the frequency of falling section from these, where level difference is large, as a valley section. And, the present invention intends to separate a plurality of targets located at the same distance and in proximity more securely, recognizing two peak directions at the front and back of the valley section as individual targets.

Herein, the antenna scanning type radar apparatus performs the processing at a specified antenna scanning position, with its frequency analyzing unit further including a second accumulation unit which accumulates a plurality of frequency spectra by analyzing the frequency at least for each the rise zone; a second judgment unit which judges a characteristic section from the plurality of frequency spectra accumulated in the second accumulation unit; and a second peak frequency extraction unit which acquires, as beat frequencies of different targets, respective beat frequencies of peak sections located at both sides of the characteristic section judged by the second judgment unit. The second accumulation unit, the second judgment unit and the second peak frequency extraction unit may process both the rise zone and the fall zone.

A fifth aspect of the present invention provides a signal processing method of an FM-CW radar. The signal processing method comprises a sending/receiving step which includes sending a sending signal which has been frequency modulated by a triangular wave signal, from an antenna which is mechanically scanned within a predetermined angular range, and mixing a signal received from the antenna and a local signal branched off from the sending signal, to thereby generate a beat signal; a frequency analysis step which includes analyzing the frequency of the beat signal for each rise zone and each fall zone of the frequency modulated by the triangular wave signal; an accumulation step which includes accumulating a plurality of changes in spectral value of a specific beat frequency acquired by the frequency analysis, corresponding to changes in the antenna scanning angle, for each different antenna scanning angle within a predetermined angular range; a judgment step which includes judging a characteristic section from changes in spectral value corresponding to a plurality of antenna scanning angles accumulated; a peak frequency extraction step which includes acquiring, as beat frequencies of targets present in different directions of scanning angle, spectral values of peak sections located at both sides of the characteristic section judged; and an operation step which includes which calculates the distance to a target and the relative speed thereto correlated with the antenna angle, based on the beat frequencies.

Herein, the frequency analysis step further includes a second accumulation step which includes accumulating a plurality of frequency spectra by analyzing the frequency at least for each the rise zone; a second judgment step which includes judging a characteristic section from the plurality of frequency spectra accumulated; and a second peak frequency extraction unit which acquires, as beat frequencies of different targets, respective beat frequencies of peak sections located at both sides of the characteristic section judged.

The second accumulation step, the second judgment step and the second peak frequency extraction step may include processing both the rise zone and the fall zone.

A sixth aspect of the present invention provides a program executed by a computer (DSP) mounted on an FM-CW radar. The program causes the computer to execute a frequency analysis step which includes inputting a beat signal acquired by sending a sending signal which has been frequency modulated by a triangular wave signal, from an antenna which is mechanically scanned within a predetermined angular range, and by mixing a signal received from the antenna and a local signal branched off from the sending signal, and analyzing the frequency of the beat signal for each rise zone and each fall zone of the frequency modulated by the triangular wave signal; an accumulation step which includes accumulating a plurality of changes in spectral value of a specific beat frequency acquired by the frequency analysis, corresponding to changes in the antenna scanning angle, for each different antenna scanning angle within a predetermined angular range; a judgment step which includes judging a characteristic section from changes in spectral value corresponding to a plurality of antenna scanning angles accumulated; a peak frequency extraction step which includes acquiring, as beat frequencies of targets present in different directions of scanning angle, spectral values of peak sections located at both sides of the characteristic section judged; and an operation step which includes which calculates the distance to a target and the relative speed thereto correlated with the antenna angle, based on the beat frequencies.

(Fixedly Installed Type Radar Apparatus)

A seventh aspect of the present invention provides a radar apparatus which is fixedly installed in a road structure for, e.g. monitoring the traffic. The radar apparatus comprises an antenna securely installed on a structure; a sending/receiving unit which sends from its antenna a sending signal which has been frequency modulated by a triangular wave signal, the sending/receiving unit mixing a signal received from the antenna and a local signal branched off from the sending signal, to thereby generate a beat signal; a frequency analyzing unit which analyzes the frequency of the beat signal for each rise zone and each fall zone of the frequency modulated by the triangular wave signal; an accumulation unit which accumulates a plurality of frequency spectra by frequency analysis at least for each the rise zone; a judgment unit which judges a characteristic section from the plurality of frequency spectra accumulated in the accumulation unit; a peak frequency extraction unit which acquires, as beat frequencies of different targets, respective beat frequencies of peak sections located at both sides of the characteristic section judged by the judgment unit; an operation unit which calculates the distance to a target and the relative speed thereto, based on the beat frequencies; and an antenna drive unit which periodically moves the installation position of the antenna within a specified range conforming to the wavelength used. In the fixedly installed type radar apparatus, phase of the received wave will not change at random, unlike the radar apparatus mounted on a vehicle or other mobile bodies, but phase will be fixed. So, the present invention intends to securely separate a plurality of targets present in proximity in a specified antenna direction, forcibly creating phase change at random, only by moving the position of the antenna. Herein, the accumulation unit, the judgment unit and the peak frequency extraction unit may process both the rise zone and the fall zone.

An eighth aspect of the present invention provides a signal processing method of a scanning type radar apparatus. The signal processing method comprises an antenna drive step which periodically moves the installation position of an antenna which is fixedly installed in a structure, within a minute range corresponding to the wavelength used; a sending/receiving step which includes sending from the antenna a sending signal which has been frequency modulated by a triangular wave signal, and mixing a signal received from the antenna and a local signal branched off from the sending signal, to thereby generate a beat signal; a frequency analyzing step which includes analyzing (by FFT) the frequency of the beat signal for each rise zone and each fall zone of the frequency modulated by the triangular wave signal; an accumulation step which includes accumulating a plurality of frequency spectra by frequency analysis at least for each FM rise zone; a judgment step which includes judging a characteristic section from the plurality of frequency spectra accumulated; a peak frequency extraction step which includes acquiring, as beat frequencies of different targets, respective beat frequencies of peak sections located at both sides of the characteristic section judged; and an operation step which includes calculating the distance to a target and the relative speed thereto, based on the beat frequencies. Herein, the accumulation step, the judgment step and the peak frequency extraction step may be effected of both the FM rise zone and the FM fall zone.

The above and other objects, aspects, features and advantages of the present invention will become more apparent from the following detailed description when read in conjugation with the accompanying drawings.

BRIEF DESCRIPTION OF THE DRAWINGS

FIG. 1 is a block diagram of a radar apparatus under the present invention;

FIGS. 2A through 2C illustrate measurement principle of a FM-CW radar apparatus;

FIGS. 15A and 15B illustrate accumulation timing against antenna scanning angle;

DETAILED DESCRIPTION OF THE PREFERRED EMBODIMENT

Figure 3:
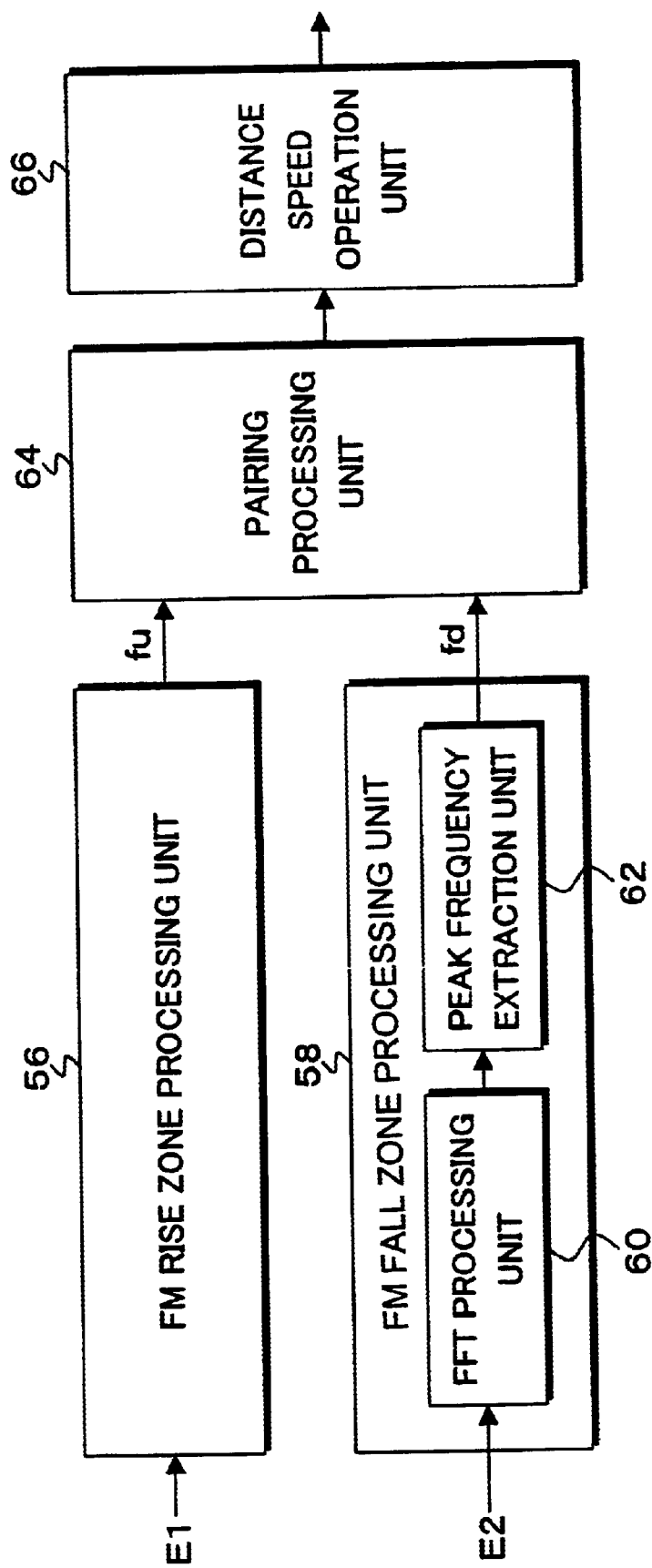
FIG. 3 is a block diagram of signal processing function under the present invention to be embodied by DSP shown in FIG. 1.

FIG. 1 is a block diagram of an FM-CW radar apparatus according to the present invention. The FM-CW apparatus under the present invention mainly comprises a signal processing unit 10, a millimeter wave unit 12 and an antenna unit 14. To the signal processing unit 10, a calling name code generator circuit 18 as a signal processing unit on the receiver side, a triangular wave generator circuit 20, and a switching circuit 22 are installed, in addition to a DSP 16, and as a signal processing unit on the receiver side, an IF amplifier 42, a second mixer 44, a base band amplifier 46, an AD converter 48 and a heterodyne oscillator 50 are installed. To the sending side at the millimeter wave unit 12, a voltage controlled oscillator (VCO) 24 of 38.26 GHz, and a sending unit 26 are installed. To the sending unit 26, duplex-frequency multiplication circuit 28 and a sending amplifier 30 are installed. To a receiving unit 36 on the receiving side of the millimeter wave unit 12, a receiving amplifier 38 and a first mixer 40 are installed. To the first mixer 40, from a directional binder 31 placed on the sending side, portion of the sending wave is added as local signal. To the antenna unit 14, a sending antenna element 32 and a receiving antenna element 34 are installed. This embodied FM-CW radar apparatus uses frequency with 76 GHz band, and in the case of monitoring one lane 100 meters ahead, the beam width will be about 2 to 3 degrees. In this case, the size of the antenna opening will be at least 10 cm in diameter, even if 60 GHz is used. Therefore, in this embodiment, a multi-element flat-face antenna with tri-plate track structure that can be downsized and slimmed down is used, because if a parabolic antenna or a KASEGUREN antenna is used, the size of the antenna unit must be larger.

Here explains the measurement principle at the FM-CW radar apparatus shown in FIG. 1, referring to FIG. 2. The FM-CW radar apparatus under the present invention modulates the sending wave of 76 GHz band with triangular signal as shown in FIG. 2A. When modulation signal of triangular wave signal is fm, the period of the modulation signal will be (1/fm). In FIG. 2A, a solid line shows the sending wave 52, whose frequency is modulated by this triangular wave signal. The antenna receives the wave sent from the antenna as the receiving wave reflected from a vehicle running at the front, and beat signal is acquired by mixing of part of the sending wave. The beat frequency of the beat signal contains signal components of the distance R up to the vehicle running at the front and relative speed V. Received wave 54 shown by a dotted line in FIG. 2A produces the Doppler shift corresponding to the time difference corresponding to the distance R of the fore-running vehicle and corresponding to the relative speed. Here, the zone in which the modulated frequency of triangular wave signal shown as the sending wave 52 is rising is called FM rise zone, and the zone in which the modulated frequency is falling is called FM fall zone. Beat signal acquired from such sending wave 52 and receiving wave 54 is as shown in FIG. 2C, and beat frequency is as shown in FIG. 2B. Two beat frequencies, beat frequency fu at the FM rise zone and beat frequency fd at the FM fall zone, are acquired for the vehicle to be one target. Based on the beat frequencies fu and fd of the beat signal, the distance R up to the fore-running vehicle and relative speed V are given by the following equations:

$$R = \frac{(f_d + f_u)c}{8\Delta f f_m} \quad (1)$$

$$V = \frac{(f_d - f_u)c}{4f_0} \quad (2)$$

where,
c: Radio wave propagation velocity (=Velocity of light)
$\Delta f$: Modulation width of triangular wave;
fm: Modulated frequency of triangular wave;
$f_0$: Modulated center frequency;
fu: Frequency of beat signal acquired at the zone where modulated signal increases (Up beat signal);
fd: Frequency of beat signal acquired at the zone where modulated signal decreases
(Down Beat Signal)

In short, in the FM-CW radar apparatus under the present invention, distance R and relative speed V can be acquired by means of measuring the beat frequency fu of the FM rise zone at triangular wave modulation signal and the beat frequency fd of the FM fall zone, and calculating the sum and the difference of the two frequencies.

Referring again to FIG. 1, description will be made in greater detail of the signal processing unit 10 and the millimeter wave unit 12. The calling name code generator circuit 18 of the signal-processing unit 10 generates specific ID No. specified for every radar apparatus 10, when the power to the apparatus is turned ON, and sends from the antenna unit 14. In Japan, it is mandatory to send this calling name code under the Wireless Telegraphy Act. The triangular wave generator circuit 20 outputs triangular wave modulation signal like the sending wave 52 shown in FIG. 2(A), based on synchronous signal sent from the DSP 16. The switching circuit 22 changed to the side of the calling name code generator circuit 18 at the time when the apparatus was powered ON, however, after that, the circuit changes to the side of the triangular wave generator circuit 20, and supplies triangular wave modulation signal from the triangular wave generator circuit 20 to the millimeter wave unit 12. Triangular wave modulation signal sent from the signal processing unit 10 controls the voltage controlled oscillator 24 of 38.25 GHz installed to the millimeter wave unit 12, and allows frequency to shift in the range of frequency modulation width $\Delta F$ shown in FIG. 2(A). As to this frequency modulation width $\Delta F$, when modulated center frequency $f_0$ to be 76.5 GHz, frequency is modulated in the frequency range set for 100 through 200 MHz. Triangular wave modulation signal of 38.25 GHz from the voltage controlled oscillator 24 is twice-frequency multiplied by the 2 frequency multiplication circuit 28 of the sending unit 26, amplified to a level required as sending output by the sending amplifier 30, and supplied to the sending antenna element 32 of the antenna unit 14. The receiving unit 36 of the millimeter wave unit 12 amplifies feeble reflected wave signal from the target received by the receiving antenna element 34 and at the same time, takes portion out of the output signal on the sending side with the directional binder 31, supplies to the first mixer 40 as local signal, and outputs IF signal, performing frequency conversion of the received signal with 76 GHz band. Here, the receiving unit 36 uses a simplified heterodyne receiving method. The simplified heterodyne receiving method is a method of converting frequency in addition to frequency conversion by local signal, with the same signal source as the switching source shown by the heterodyne oscillator 50, supplying oscillation signal from the heterodyne oscillator 50 to the receiving antenna 38 and switching. To be more specific, drain voltage of FFT used for amplifying stage in the receiving amplifier 38 is turned ON and OFF by switching signal from the heterodyne oscillator 50 to give switching effect. After amplified by the IF amplifier 42, IF signal that frequency converted by the receiving unit 36 is further frequency converted to the base band signal by the second mixer 44. Base band signal from the second mixer 44 becomes signal, for instance, having 400 KHz band. After amplified by the baseband amplifier 46, base band signal is sampled and converted into digital signal by the A/D converter 48, and inputted to the DSP 16. The signal to be outputted from the base band amplifier 46 is a beat signal shown in FIG. 2C, and includes beat frequency fu of the FM rise zone and beat frequency fd of the FM fall zone as shown in FIG. 2C. The DSP 16 captures beat signal that was sampled and converted into digital signal by the A/D converter 48, synchronizing this digital signal to triangular wave modulation signal, and executes FFT operation (Fast Fourier Transform) for every zone of the individual beat signal of the FM rise zone and beat signal of the FM fall zone, to consequently acquire beat frequencies fu and fd of each zone. In the FFT operation for this purpose, the frequency peak value is to be acquired at a high accuracy rate, by using of, for instance, complex frequency interpolation method. By substituting of each of the beat frequencies fu and fd acquired as described above into the equations (1) and (2), the distance R up to the forerunning vehicle, or the target, and relative speed V can be acquired. The distance R to the forerunning vehicle, the target, and relative speed V acquired by the DSP 16 are used for an automobile driving support system including control of the accelerator or brake, in addition to a collision-warning, or an obstruction-warning.

FIG. 3 is a block diagram of signal processing function of the present invention to be embodied by the DSP 16 shown in FIG. 1. The signal processing function by the DSP comprises an FM rise zone-processing unit 56, an FM fall zone-processing unit 58, a pairing processing unit 64 and a distance/speed operation unit 66. The FM rise zone-processing unit 56 and the FM fall zone-processing unit 58 input already AD converted beat signals E1 and E2 of the individual zones, and after performing FFT operation, extracts frequencies at peak levels from frequency spectrum acquired as the result of FFT operation and outputs as beat frequencies fu and fd. Here, in the FM rise zone-processing unit 56, as later description will made it clear, under the present invention, a processing function to separate and detect a plurality of targets with a high accuracy rate is provided, against fluctuation in overlapping state of peaks of nearby beat frequencies caused by phase difference of reflected waves from a plurality of targets located in proximity in the same direction, viewed from the antenna. On the contrary, the FM fall zone-processing unit 58 having only an FFT processing unit 60 and a beat frequency extraction unit 62, acquires frequency spectrum, performing FFT operation of beat signal E2 of the FM fall zone, and extracts frequency at a peak level from the frequency spectrum and outputs as beat frequency fd. The pairing processing unit 64 pairs the beat frequency fu with the beat frequency fd individually outputted from the FM rise zone-processing unit 56 and the FM rise zone-processing unit 58. This pairing is performed when a plurality of beat frequencies are acquired in each zone from reflected waves of a plurality of targets, so that the level in each zone becomes the same. The distance/speed operation unit 66 substitutes every pair of beat frequencies (fu, fd) outputted from the pairing processing unit 64 into the equations (1) and (2), and calculates and outputs the distance R up to the target and relative speed.

Figure 4:
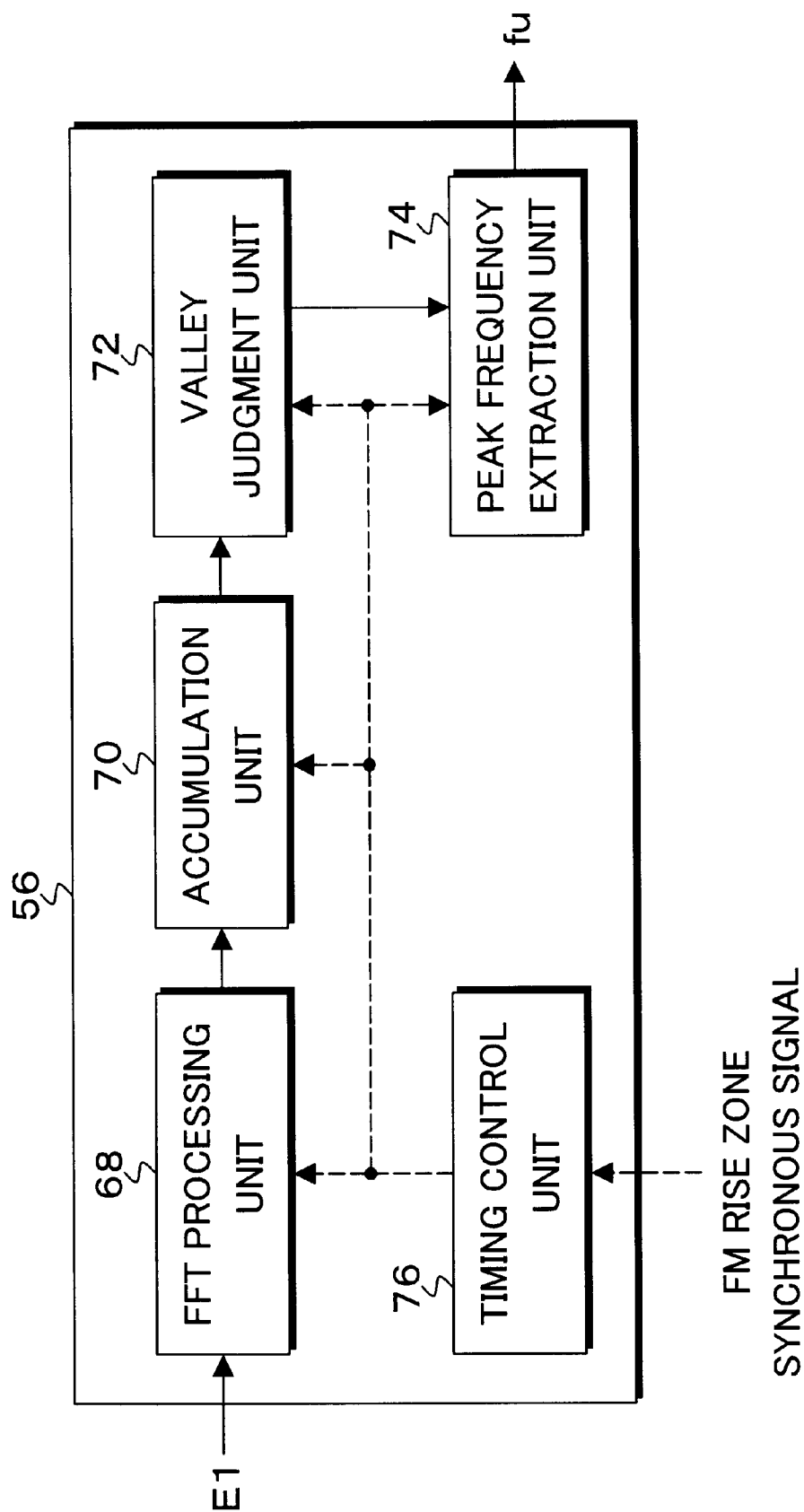
FIG. 4 is a block diagram of functional configuration by the present invention at the FM rise zone-processing unit shown in FIG. 2.
Figure 5:
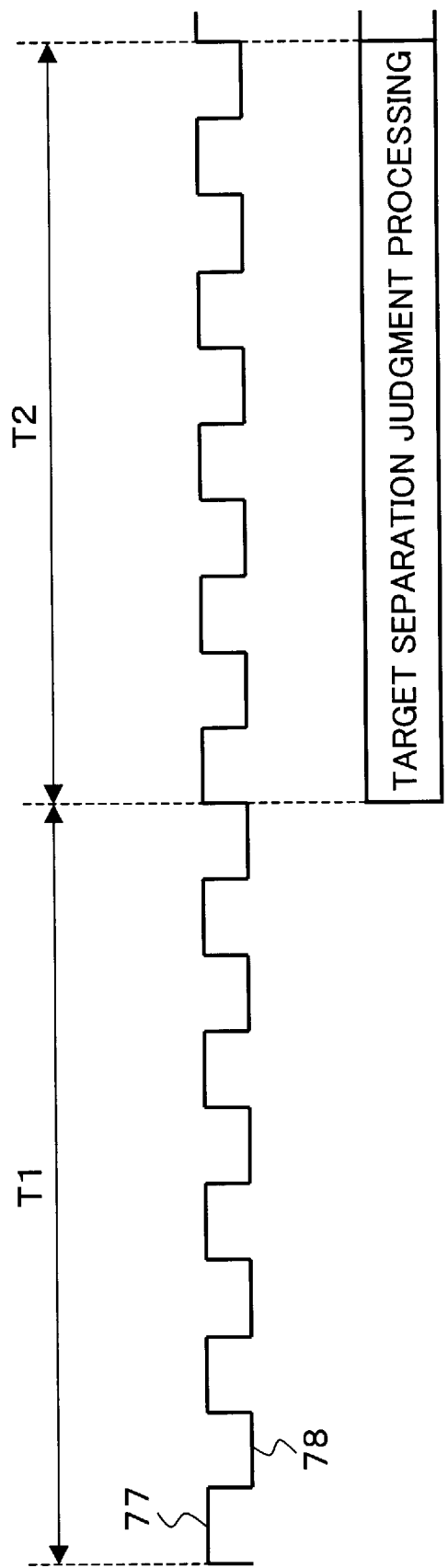
FIG. 5 illustrates timing of beat frequency judgment processing.

FIG. 4 is a block diagram of functional configuration for separating targets, according to the present invention, that is installed to the FM rise zone-processing unit 56 as shown in FIG. 3. The FM rise zone-processing unit 56, applicable to signal processing of the present invention, has an FFT processing unit 68, an accumulation unit 70, a valley judgment unit 72, a peak frequency extraction unit 74 and a timing control unit 76. The FFT processing unit 68 inputs the already AD converted beat signal, with regard to the FM rise zone-processing unit, and acquires frequency spectrum pattern, for instance, that is drawn with the horizontal axis representing frequency axis, and the vertical axis representing relative amplitude, as the result of frequency analysis by FFT operation. Frequency spectrum pattern operated by the FFT processing unit 68 is accumulated in the accumulation unit 70 for a plurality of times. As to the frequency spectrum pattern to be accumulated in the accumulation unit 70 as the result of FFT operation, accumulation would be preferably performed some 5 to 10 times repeatedly. As to the accumulation, the less number of times would be the better, to shorten the processing time, and for instance, in this embodiment, accumulation is performed 5 times. The valley judgment unit 72 comparatively judges the valley sections between peak-to-peak of nearby beat frequencies generated at the time when two targets are present in the same direction and in proximity, viewed from the antenna, with regard to the frequency spectrum pattern as the result of FFT operation for a plurality of times and accumulated in the accumulation unit 70. The peak frequency extraction unit 74 extracts frequencies of two peak sections present on the both sides of the frequency judged as valley section by the valley judgment unit 72, recognizing them as the beat frequencies fu1 and fu2 by two targets, and outputs the extracted frequencies to the pairing processing unit 64 shown in FIG. 3. As shown in timing illustration shown in FIG. 5, after controlling the accumulation unit 70 during T1 period of time, allowing the unit to repeat the accumulation of frequency spectrum pattern 5 times, as the operation result of the FFT processing unit 68 in the FM rise zone 77, the timing control unit 76 activates the valley judgment unit 72 and the peak frequency extraction unit 74, and performs target separation judgment processing by extraction of beat frequency of peaks on both sides based on judgment of valley section against a plurality of frequency spectrum patterns during the next accumulation period T2.

Figure 6:
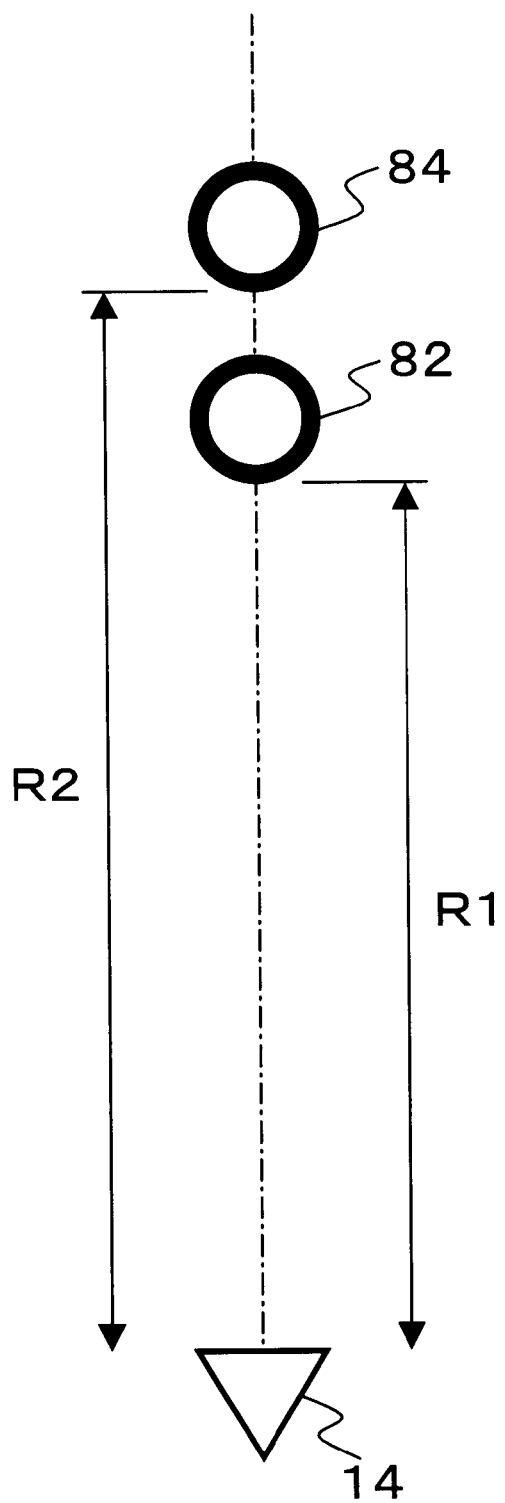
FIG. 6 illustrates measuring state when two targets are present in the same direction.

FIG. 6 illustrates measurement state when two targets, for which target separation processing of the FM rise zone-processing unit 56 shown in FIG. 4 is effective, are present in the same direction and in proximity viewed from the antenna. In this case, two targets, 82 and 84 are present in the same direction viewed from the antenna unit 14, and respective distances are R1 and R2. In such a case, beat frequencies of beat signals by the received waves from the targets 82 and 84, against the sending wave from the antenna unit 14 are close, and frequencies are also close on peak levels for extracting each beat frequency in frequency spectrum pattern acquired as the result of FFT operation. Under this condition, the antenna unit 14 mounted on the vehicle always produces slight change in its position by the vibrating vehicle while running, and because of the position change, phases of the received waves from the targets 82 and 84 fluctuate at random.

Figure 7:
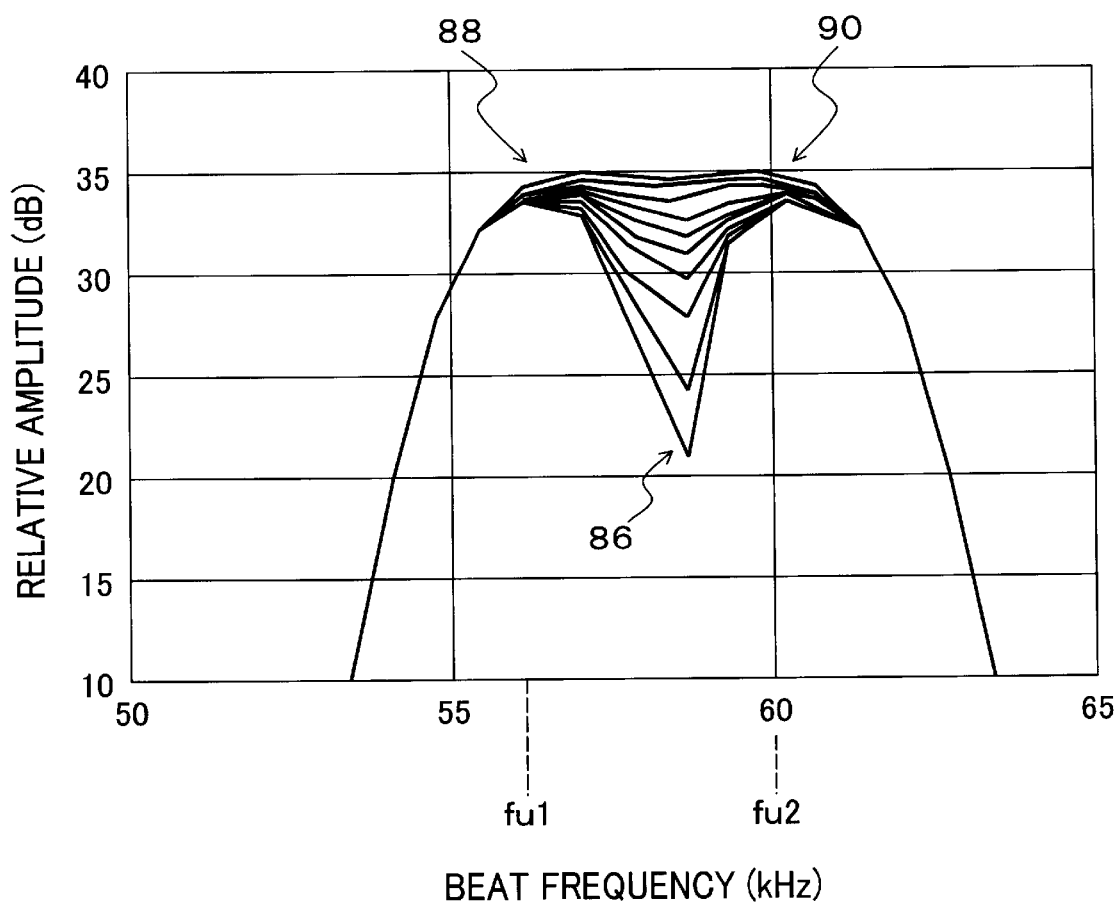
FIG. 7 is a characteristic diagram showing change in frequency spectrum acquired by FFT against change in phase difference of received wave of the target.

FIG. 7 shows an example of the result of measuring frequency spectrum pattern that is the result of FFT operation of beat signals of the received waves from the two targets 82 and 84 as shown in FIG. 6. Here, such a case is taken that the beat frequency fu1 from the target 82 located at distance R1 to be 56.5 KHz, while the beat frequency fu2 acquired by FFT operation of beat signal from the target 84 located at distance R2 to be 60 KHz. With regard to the beat frequencies fu1 and fu2 that depend on the targets 82 and 84 in such nearby positions, when phase of the received wave is changed at random by simulation, separation of peaks can be made, because the valley section 86 sinks enough against the two peak sections 88 and 90 as phases moving closer to negative phase. Also, when there is no phase difference and phases are moving closer to the same phase, the sinking state of the valley section 86 between the peak sections 88 and 90 can be hardly perceptible, and only one peak section can be seen from frequency spectrum pattern, so that two targets cannot be separated. The method by which peak sections are synthesized by phase difference changing at random of the reflected waves from such two targets varies at random, and two targets can be properly separated if in the timing when the valley section 86 is sinking enough, but if separation is made in the timing when the valley section 86 is almost flush with the peak sections, two targets can be erroneously judged as one target.

Therefore, the present invention pays attention to the point that change in the sinking state of the valley section 86 between the peak sections 88 and 90 by the two targets as shown in FIG. 7 takes place at random caused by phase difference, and the present invention plans to, after accumulating frequency spectrum pattern acquired as the result of FFT operation for a plurality of times, for instance, accumulating 5 times, judge the valley section 86 as to the frequency spectrum patterns accumulated 5 times, recognizing the peak sections 88 and 90 on both sides of the frequency judged as the valley section 86 to be peaks by the targets, and extract these beat frequencies fu1 and fu2. As for fluctuation in level of the valley section between two peaks that could change at random by the phase difference, the valley section can be securely judged, because if the frequency spectrum pattern is accumulated for 5 to 10 times, the accumulated patterns surely contain such level change that can be almost perfectly regarded as the valley section 86. As a matter of course, the less number of times would be the better for accumulation, however, 2 to 3 times of accumulation may result in acquiring insufficient patterns that would fail to demonstrate the occurrence of level change of the valley section 86, therefore, repetition of 5 times or so is preferable. Also, if the number of accumulation times is increased, for instance, to 10 times, the accuracy in separation can be enhanced, but, proper number of accumulating times must be determined, in consideration of processing time and accuracy in separation, because delay of processing time would increase if the number of accumulating times is increased.

Figure 8:
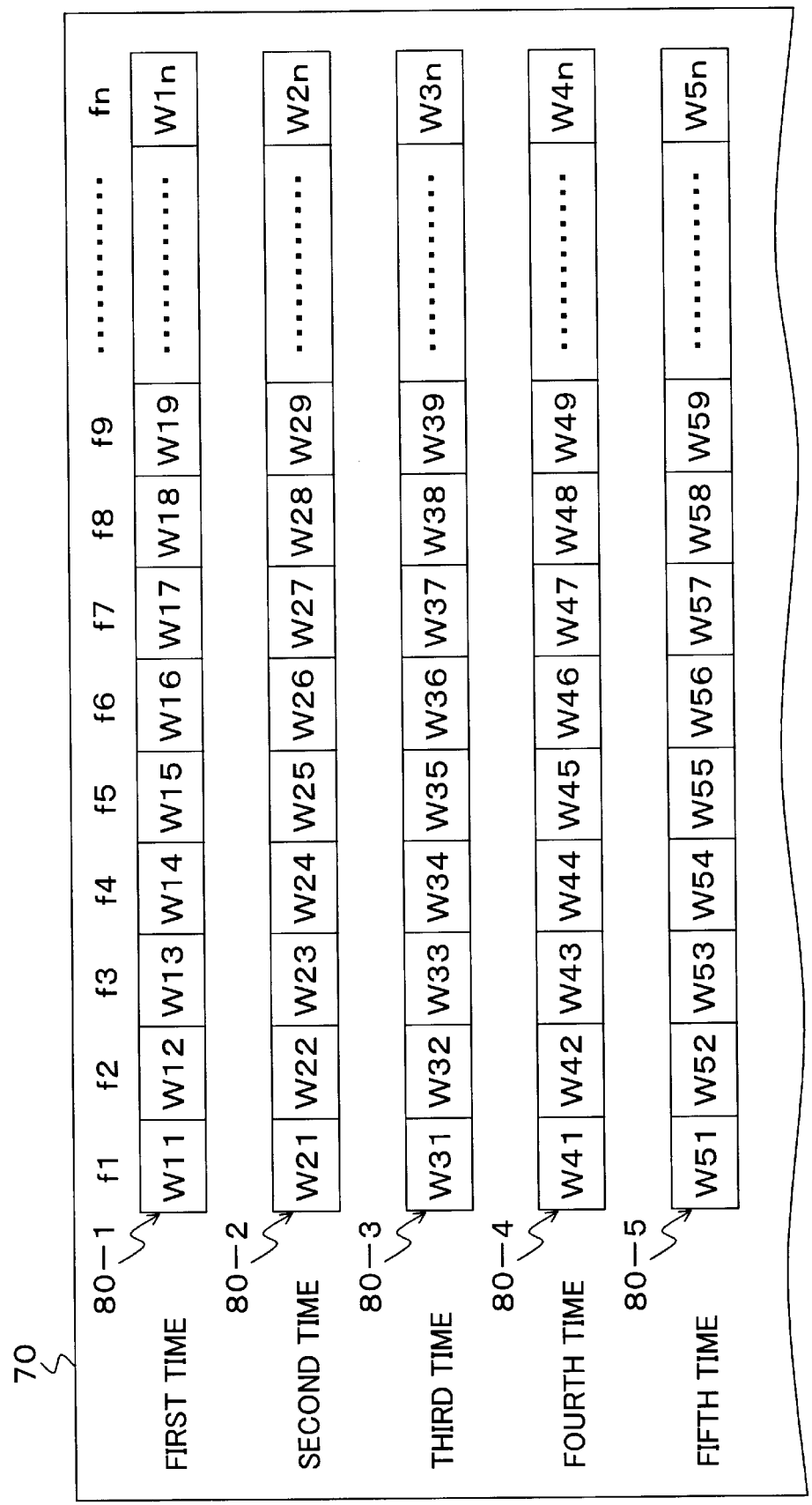
FIG. 8 illustrates stored state of frequency spectrum at the accumulation unit.

FIG. 8 shows stored state of frequency spectrum pattern as the result of FFT operation accumulated in the accumulation unit 70 shown in FIG. 4, and shows a series of storage from 80-1 through 80-5 for 5 times of accumulation. The series of storage from 80-1 through 80-5 has frequencies f1 through fn with a specified resolution in the storage direction, for instance, as shown by a series of storage 80-1 of the first time, and in each frequency position, stores relative amplitudes W11 through W1n at frequency spectrum pattern. Judgment of a valley section by the valley judgment unit 72 shown in FIG. 4, for instance, with regard to the series of storage 80-1 through 80-5 accumulated 5 times in the accumulation unit 70 as shown in FIG. 8, for instance, whichever one of the following can be taken:

(1) Frequency between two peaks, the level of which dropping down beyond the predetermined value, is taken as a valley section;
(2) As to each series of patterns, section where level is dropping is to be found between two peaks, and the total sum of dropping levels is to be found, and as to the total sum, the section where level dropped down beyond the predetermined value is to be found, so as to judge the frequency of a valley section;
(3) After differentiating of each series of storage pattern, if the result of differentiation is minus and the level of frequency dropping down beyond the predetermined value, that frequency is taken as a valley section; or
(4) The total sum of the result of differentiating each series of storage pattern is to be found, and frequency, which exceeds the predetermined level in a minus direction, is taken as a valley section.

In addition to these, a valley section between two peaks can be judged by taking, for instance, of difference of frequency spectrum patterns to be accumulated and to be storage series for a plurality of times.

Figure 9:
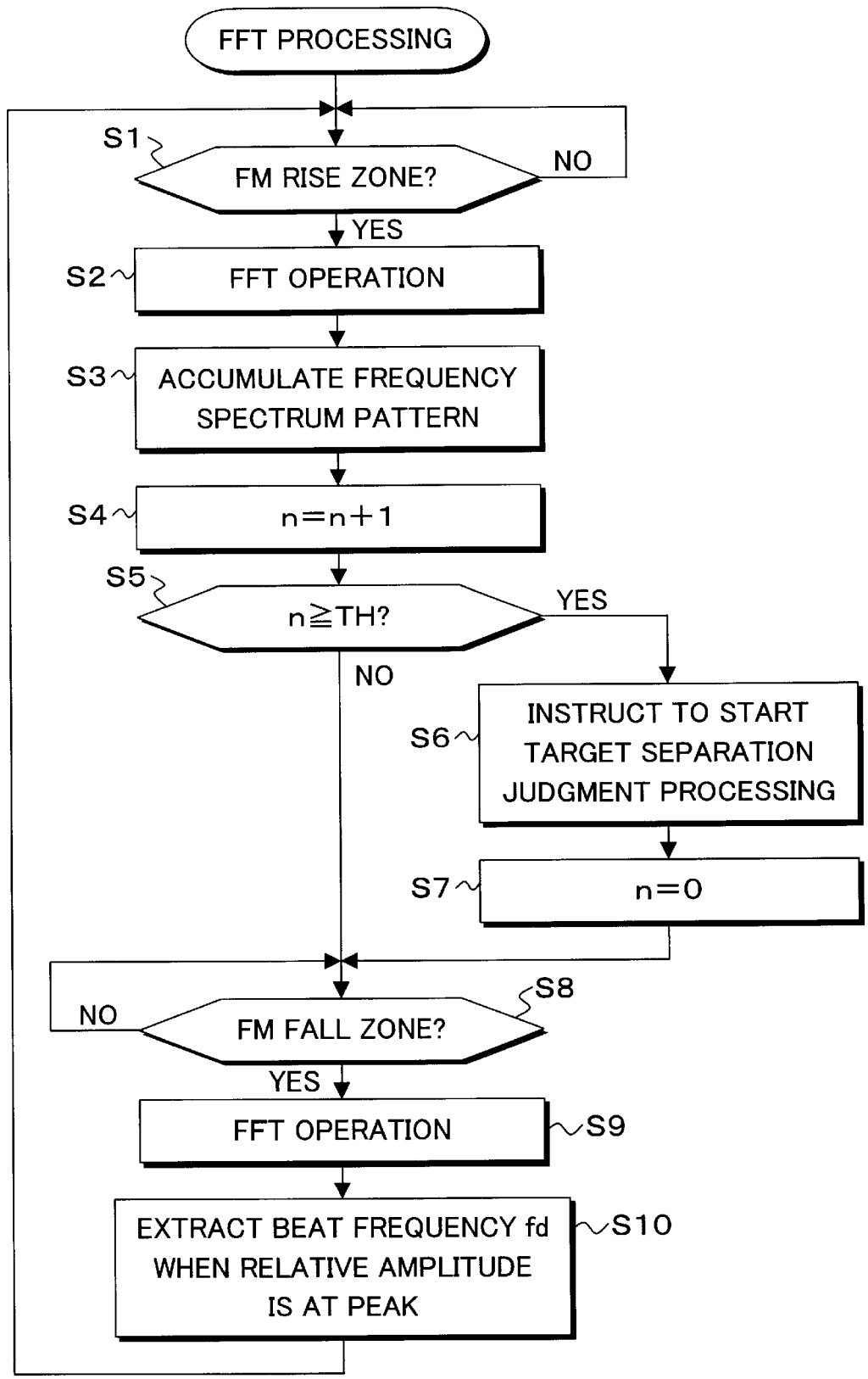
FIG. 9 is a flowchart of FFT processing shown in FIG. 5.

FIG. 9 is a flowchart of FFT processing including accumulation processing by the FFT processing unit 68 and the accumulation unit 70 installed to the FM rise zone-processing unit 56, and this FFT processing forms a part of a program to be executed by the DSP 16 shown in FIG. 1. This FFT processing recognizes at a step S1 that the zone is the FM rise zone, and at a step S2, executes FFT operation for beat signal captured by AD conversion, and at a step S3, accumulates frequency spectrum pattern having relative amplitude W to be acquired as frequency spectral value against frequencies f1 through fn having a specified resolution as shown in FIG. 8. Next, at a step S4, processing counts up a counter n by 1. By the way, the initial setting for the counter n is n=0. Then, at a step S8, processing checks whether the counter n reached a specified threshold value TH, for instance, TH=5 or more. If the counter n does not reach threshold value TH, processing goes on to a step S8, and after recognizing the zone is the FM fall zone, at a step S9, executes FFT operation for beat signal acquired as to the FM fall zone, and at a step S10, extracts beat frequency fd where relative amplitude in the frequency spectrum pattern acquired as the result of FFT operation becomes peak. By the repetition of these steps S1 through S5, and the step S8 through S10, when the counter n agreed with the threshold value TH at the step S, processing goes on to a step S6, and after giving instruction to start the target separation judgment processing that is prepared as another routine, at a step 7, processing resets the counter n to 0, and then repeatedly executes the above processing.

Figure 10:
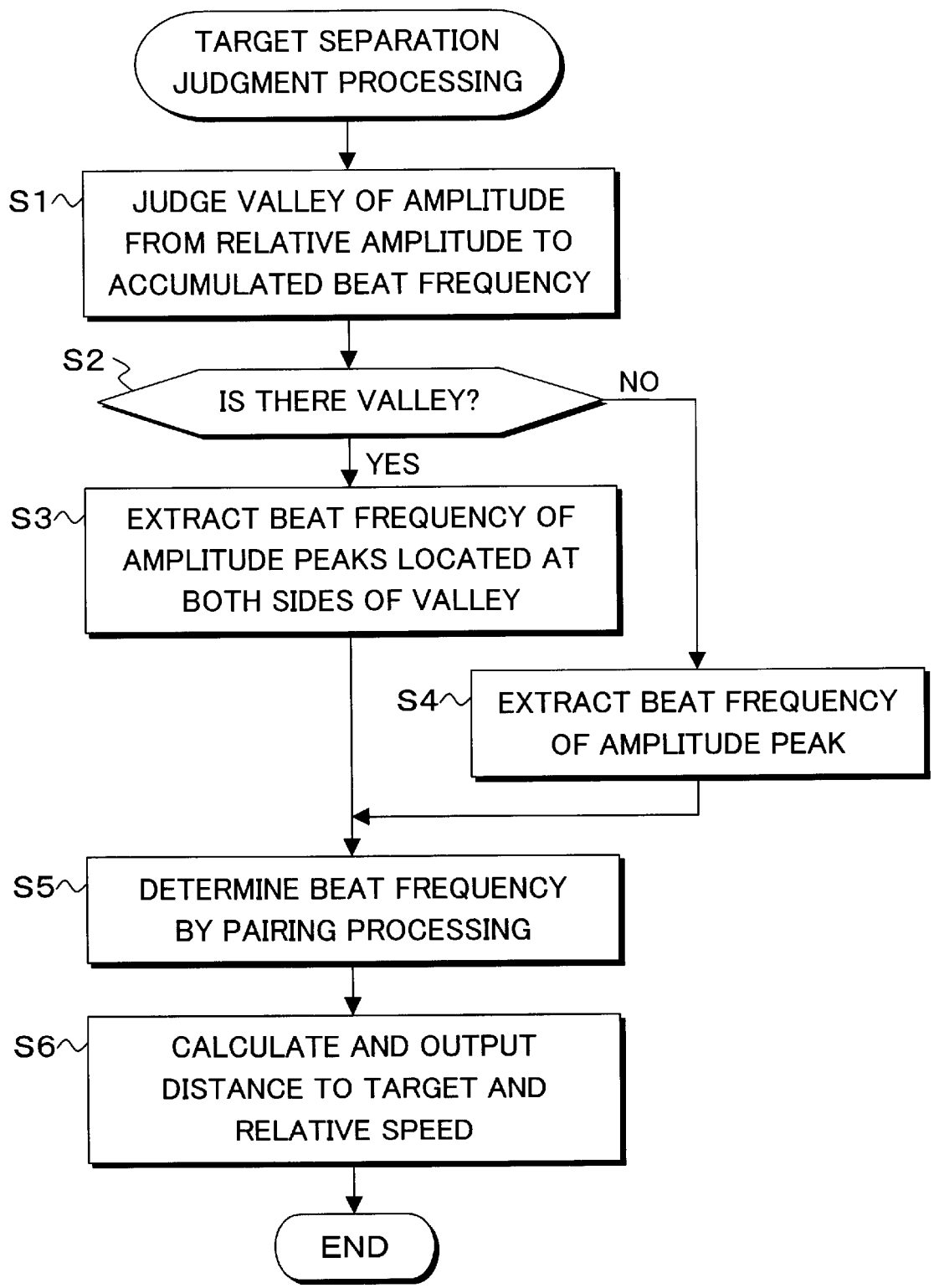
FIG. 10 is a flowchart of target separation judgment processing to be ON at every accumulation time of predetermined times shown in FIG. 9.

When an instruction is delivered to start the target separation judgment processing at the step S6, the target separation judgment processing shown in FIG. 10 is executed. The target separation judgment processing forms a part of a program of the DSP 16 as shown in FIG. 1, like the FFT processing shown in FIG. 9, corresponding to the processing functions of the valley judgment unit 72 and the peak frequency extraction unit 74 shown in FIG. 4. In the target separation judgment processing shown in FIG. 10, at the step S1, judgment processing of a valley section is executed for the accumulated frequency spectrum patterns for a plurality of times, for instance, the storage series 80-1 through 80-5 accumulated 5 times as shown in FIG. 8. When the valley section is judged at the step S2, based on the judgment result, processing goes on to the step S3, and each beat frequency of the peak sections located at the both sides of the valley section is extracted. While there was not any valley section at the step S2, processing goes on to the step S4, because the target is only one, and beat frequency of the amplitude peak is extracted. Next, processing goes on to the step S5, and after pairing processing is performed to combine frequencies on the same level together, with regard to the beat frequency fu of the FM rise zone already acquired at the steps S3 and S4, and the beat frequency fd of the FM fall zone already acquired at the step S10 shown in FIG. 9, at the step S6, the paired beat frequencies (fu and fd) are substituted into the equations (1) and (2) to find the distance R to the target and relative speed V. The operation of the distance and relative speed is performed for every paired target.

Figure 11:
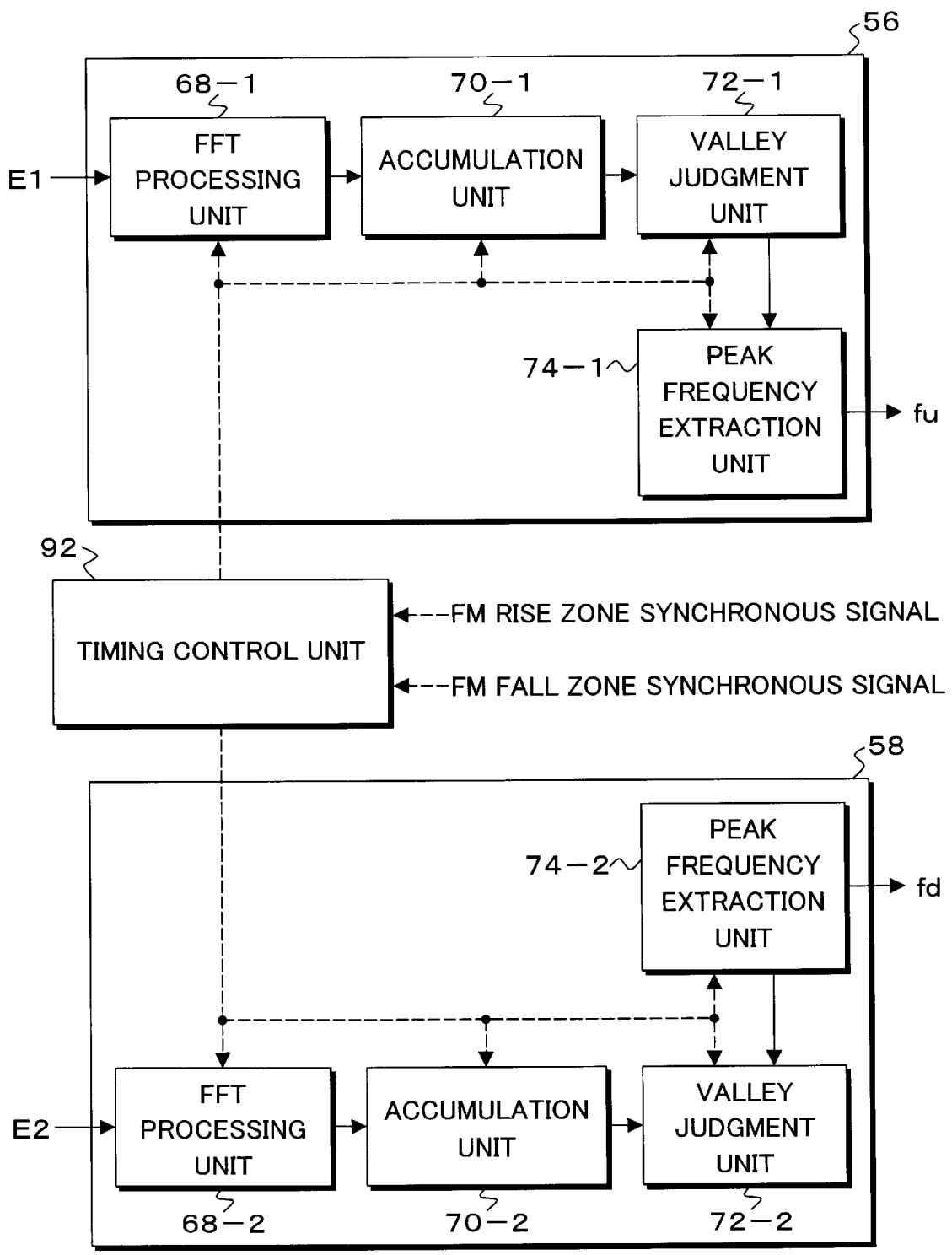
FIG. 11 is a block diagram of an embodiment to perform peak judgment as to both of the FM rise zone and the FM fall zone.

FIG. 11 shows another embodiment of the FM-rise zone-processing unit 56 and the FM fall zone-processing unit 58 shown in FIG. 3, and in the embodiment shown in FIG. 3, only to the FM rise zone-processing unit 56, as shown in FIG. 4, a function is provided to separate and judge targets from the variations in the levels caused by phase difference of two targets located in the same direction and in proximity viewed from the antenna, however, this embodiment features that this function is similarly provided for the FM fall zone-processing unit 58. In other words, in the embodiment shown in FIG. 11, to the FM rise zone-processing unit 56 and the FM fall zone-processing unit 58, FFT processing units 68-1and 68-2, accumulation units 70-1 and 70-2, valley judgment units 72-1 and 72-2, and peak frequency extraction units 74-1 and 74-2 are installed, and accumulation and valley judgment for separating/evaluating targets, and further peak extraction are executed by the timing control unit 92. As described above, with regard to both of the FM rise zone-processing unit 56 and the FM fall zone-processing unit 58, by means of separating targets in consideration of overlapping change of peak levels caused by variations in phases of the reflected waves of two targets located in the same direction and in proximity viewed from the antenna, measurement of targets at further higher accuracy rate can be embodied.

Figure 12:
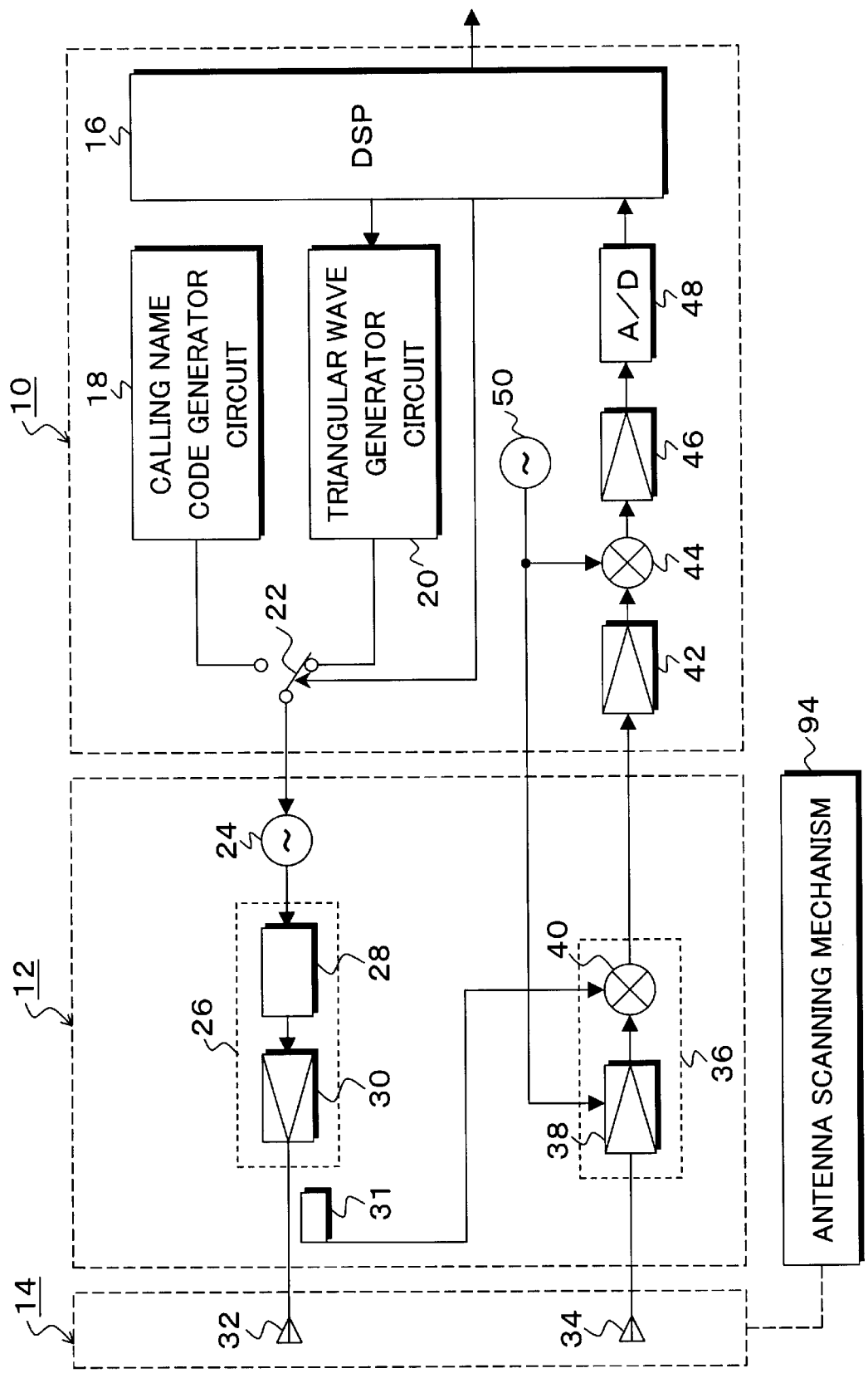
FIG. 12 is a block diagram of the FM-CW radar apparatus under the present invention applicable to an antenna scanning type.

FIG. 12 shows another embodiment of the FM-CW radar apparatus under the present invention, and this embodiment is applied to an apparatus that scans an antenna in a horizontal direction. The FM-CW radar apparatus mainly comprises the signal-processing unit 10, the millimeter wave unit 12 and the antenna unit 14, and each configuration is the same as in the embodiment shown in FIG. 1. In addition to these, in this embodiment, an antenna scanning mechanism 94 is provided for the antenna unit 14. The antenna scanning mechanism 94 mechanically connects the antenna unit 14 through a motor driven link mechanism and a gear train, so that the antenna unit 14 scans within a predetermined angular range in a horizontal direction. For instance, when monitoring of 3 lanes, including own driving lane and two lanes at the both sides of the own driving lane, is to be made by the antenna unit 14, 100 meters ahead, the antenna is allowed to scan in a horizontal direction within the range of, for instance, ±6° by the antenna scanning mechanism 94.

Figure 13:
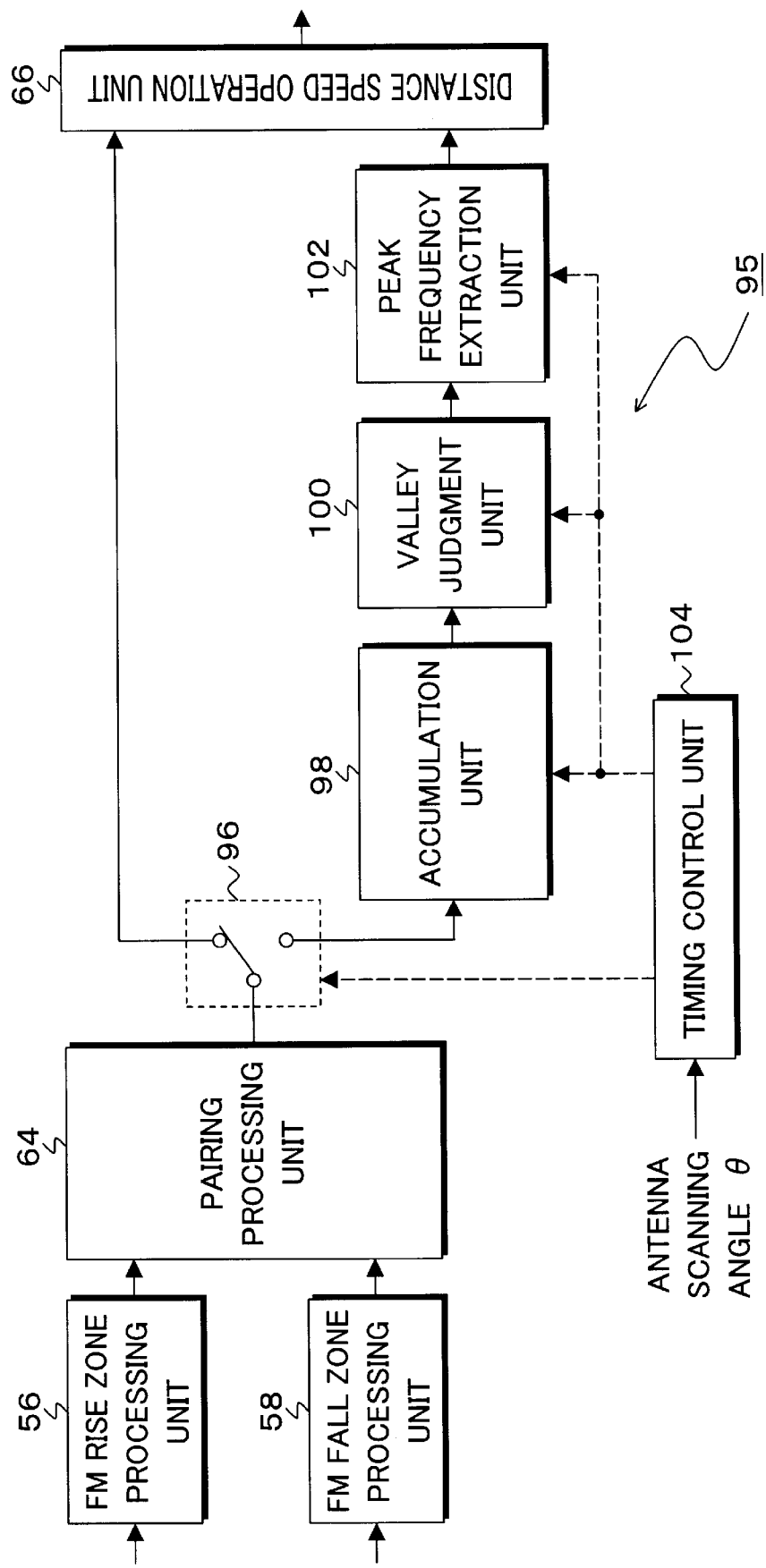
FIG. 13 is a block diagram of signal processing function under the present invention to be embodied by DSP shown in FIG. 12.
Figure 14:
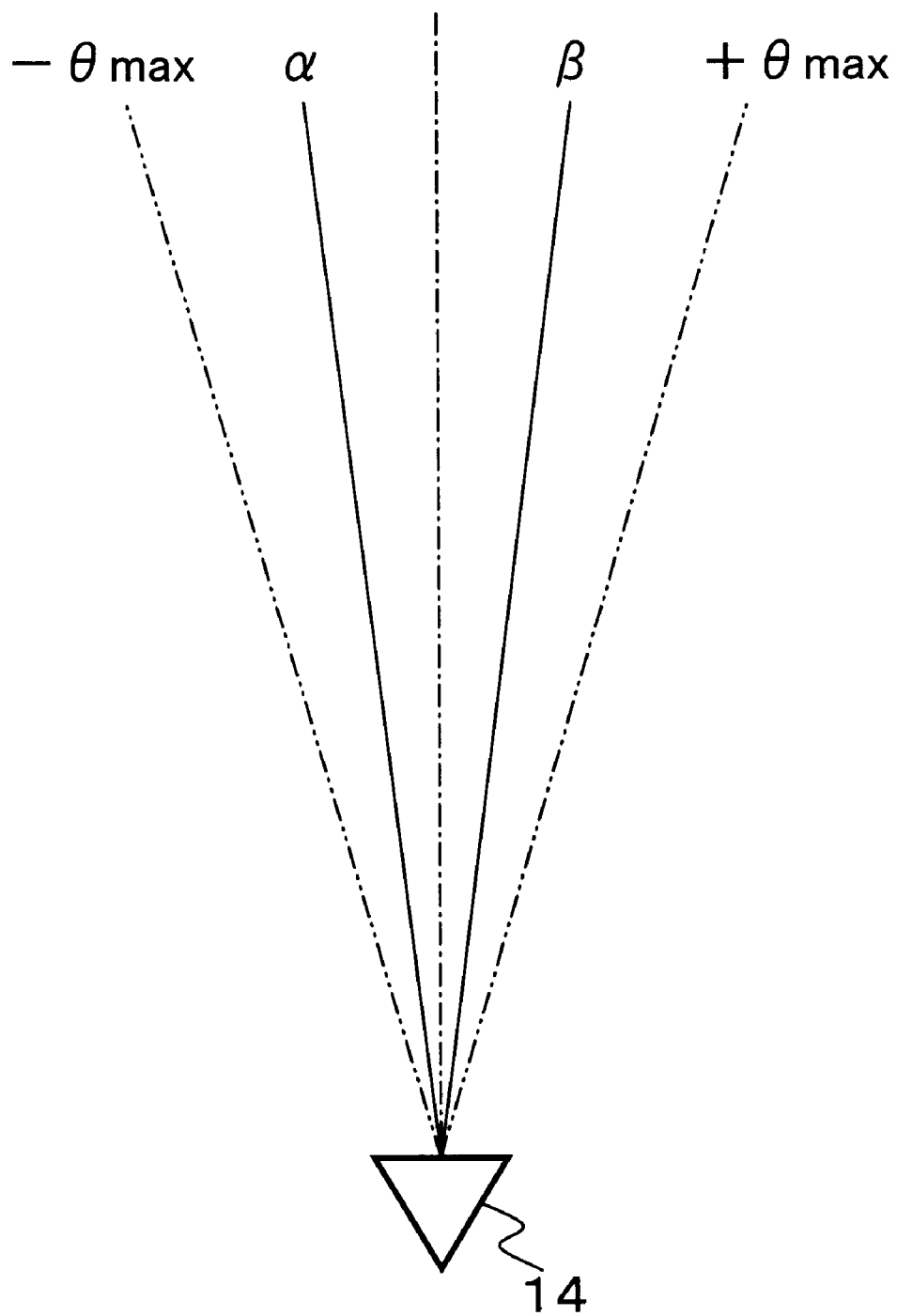
FIG. 14 illustrates the antenna scanning range.

FIG. 13 is a block diagram of a signal processing function under the present invention to be embodied by the DSP 16 installed to the signal-processing unit 10 shown in FIG. 12. The signal-processing function by the DSP 16 includes the FM rise zone-processing unit 56, FM fall zone-processing unit 58, and the pairing processing unit 64. This section is the same as in the embodiment shown in FIG. 3, and also the FM rise zone-processing unit 56 and the FM fall zone-processing unit 58 may have the embodiment shown in FIG. 11. Further, like the FM fall zone-processing unit 58 shown in FIG. 3, the FM rise zone-processing unit 56 and the FM fall zone-processing unit 58 may be processing units simply having the FFT processing unit and the peak frequency extraction unit, but do not have a function of target separation/judgment processing as shown in FIG. 4. Following the pairing processing unit 64, a target separation/evaluating unit 95 according to the present invention is installed. The target separation/judgment unit 95 is installed for preventing an erroneous judgment caused by phase difference of the received waves when there are two targets located at the same distance and in nearby angular ranges viewed from the antenna scanning horizontally, to judge these two targets as one. A switching circuit 96 of the target separation/judgment unit 95 performs switching within the antenna angular range where two targets cannot be separated. FIG. 14 shows horizontal scanning of the antenna unit 14. The antenna unit 14 is scanned horizontally in the range from −θmax to +θmax. In this range, range α to β is set as the angular range to perform target separation processing. The switching circuit 96 shown in FIG. 13 switches over to the accumulation unit 98 side, when the scanning angle θ of the antenna unit 14 is within the angular range of α to β, or otherwise, changes over to the distance/speed operation unit 66 side. Because of this, with regard to the beat frequency pair (fu, fd) from the pairing processing unit 64, which is acquired within the angular range of α to β, processing by the target separation/judgment unit 95 is executed. The target separation/judgment unit 95 comprises an accumulation unit 98, a valley judgment unit 100, a peak frequency extraction unit 102 and a timing control unit 104. The timing control unit 104 controls the switching circuit 96, and the operation of the target separation/judgment unit 95, based on the antenna scanning angle θ.

Figure 15A:
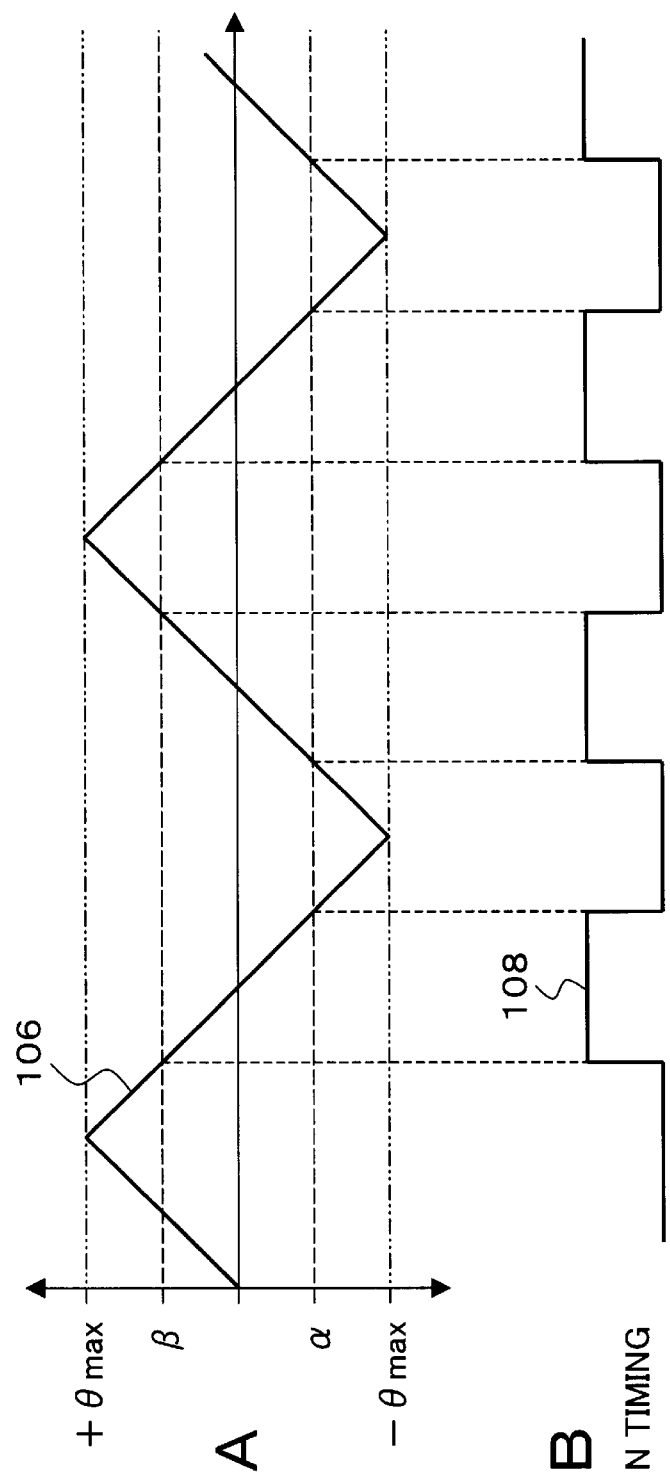

FIG. 15A shows characteristic 106 of the antenna scanning angle θ, and for instance, the angle changes linearly, in a fixed cycle. Against the characteristic 106 of the antenna scanning angle θ, the angular range α, β is set for performing target separation/judgment processing, and within that range, accumulation 108 like accumulation timing shown in FIG. 15B is performed.

Figure 16:
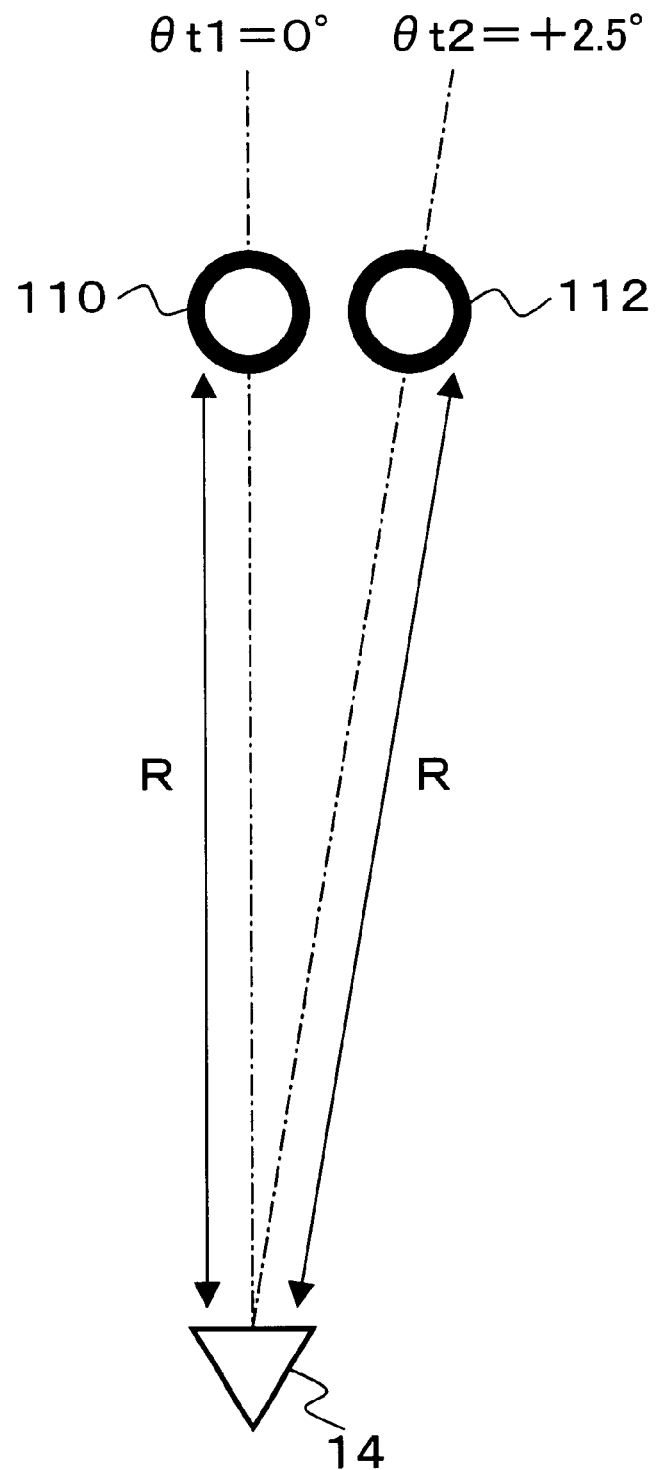
FIG. 16 illustrates antenna scanning when two targets are present at the same distance and in the positions at close angles.

FIG. 16 shows the state of two targets to the antenna to be processed by the target separation/judgment unit 95 shown in FIG. 13. Viewed from the antenna unit 14, two targets 110 and 112 are present at the same distance and at nearby angles, like at the antenna scanning angles θt1 and θt2. In this case, beat frequencies extracted by FFT operation of beat signal acquired from the received waves from the targets 110 and 112 of the antenna unit 14 are the same beat frequencies, with regard to both of the target 110 and the target 112. However, as the antenna scanning angles θt1 and θt2 are different, and if the difference in these scanning angles is large, targets can be discriminated sufficiently, however, when the targets are located at nearby angles, for instance, against θt=0°, θt2 =2.5° as noted in the drawing, the frequency spectral value, or the value of relative amplitude in the same beat frequencies is affected by phase difference caused by interference of reflected wave, thereby causing a phenomenon to be observed, where levels in each antenna scanning angle being overlapped.

Figure 17:
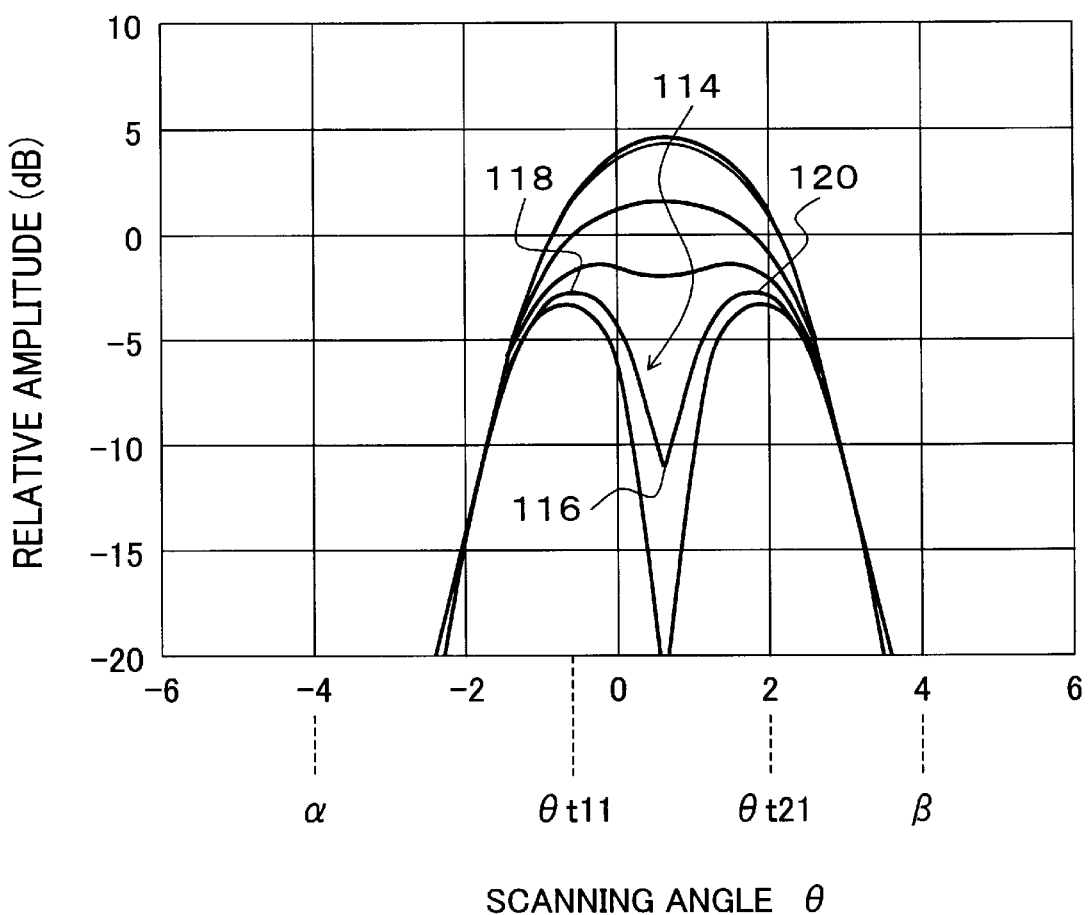
FIG. 17 is a characteristic diagram of change in beat frequency spectral value to scanning angle acquired from antenna scanning performed a plurality of times repeatedly toward the target.

FIG. 17 shows the result of measurement when phase difference varied by simulation in the case where angle θ in horizontal direction is taken to the horizontal axis, and relative amplitude of frequency spectral value acquired by the same beat frequency is taken to the vertical axis. When phases of the received waves from the two targets 110 and 112 are in the opposite state, frequency power spectral value to be the same frequency, in other words, the value of relative amplitude to be peak has peak sections 118 and 120 at each target position against the change in angle θ in horizontal direction, and also has a valley section 116 between the two peaks, thereby facilitating secure separation of two targets. On the contrary, when phases of the received waves from the two targets 110 and 112 are getting near to the same phase, the valley section 116 between target-to-target will be filled up against the change in the angle in a horizontal direction, and when the phases became exactly the same, the valley section 116 disappears and becomes measurement characteristic of one target having only a single peak. Now, in the target separation/judgment unit 95 shown in FIG. 13, against level fluctuation between peak-to-peak of two targets shown in FIG. 17, caused by variations in phases of the received waves from both of two targets, when two targets 110 and 112 are present at the same distance R and in a narrow angular range viewed from the antenna unit 114, as shown in FIG. 16, frequency spectral value, in other words, the value of relative amplitude in the extracted beat frequency acquired by scanning performed a plurality number of times is accumulated by the accumulation unit 98. And from the accumulation result of the number of antenna scanning times for a plurality number of scanning times, the valley judgment unit 100 detects the valley section 116 between the peak sections 118 and 120 shown in FIG. 17, and the peak frequency extraction unit 106 judges that the targets are present at the angles θt1 and θt2 in horizontal direction of the peak sections 118 and 120 located at the both sides of the valley section 116, and then, with regard to these separated two targets, distance and relative speed are calculated based on beat frequency.

Figure 18:
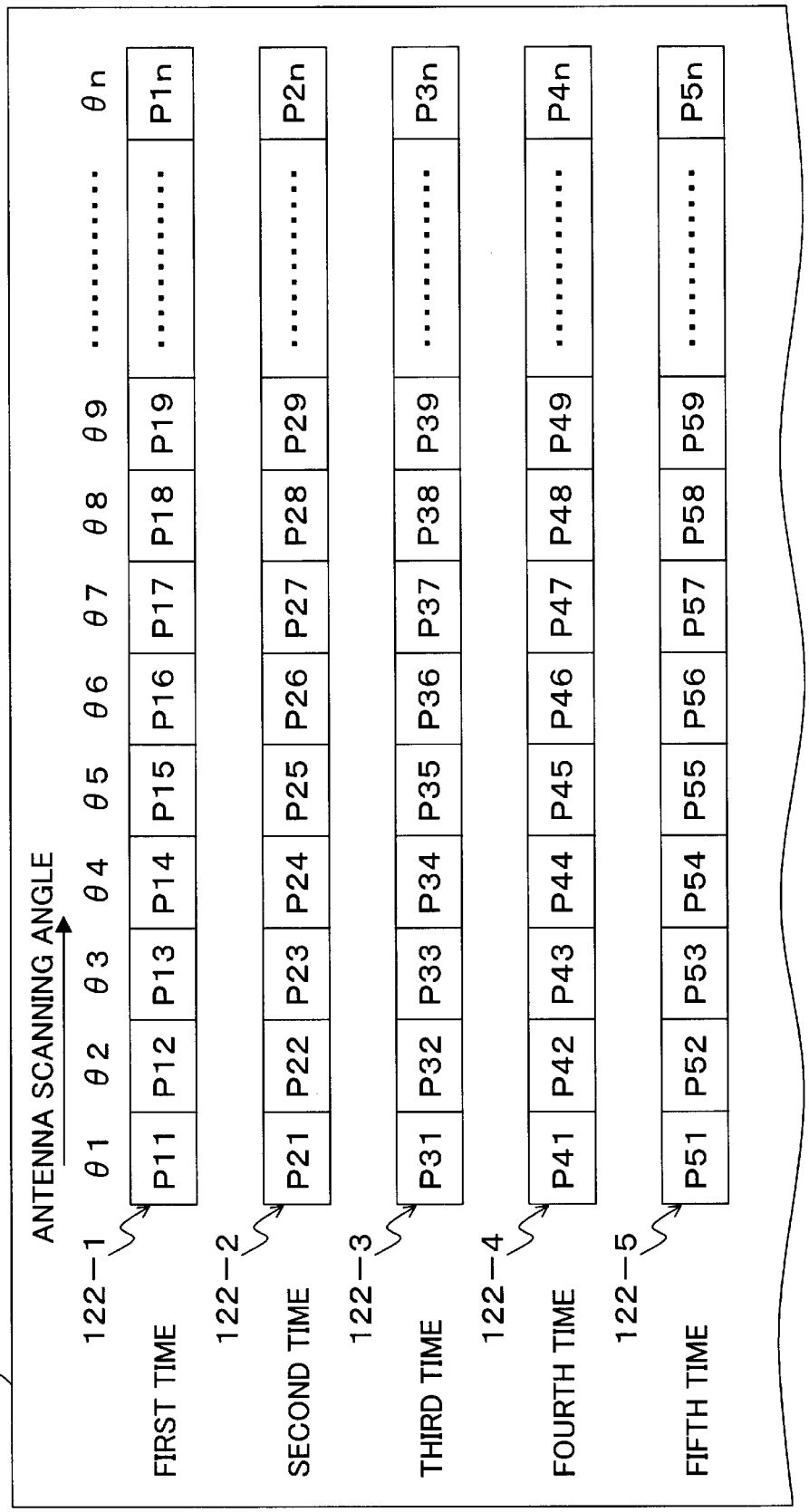
FIG. 18 illustrates stored state of beat frequency spectral value at the accumulation unit shown in FIG. 13.

FIG. 18 illustrates a series of storage 122-1 through 122-5 accumulated in an accumulation unit 98 for 5 times scanning of the pattern of relative amplitude value of the same beat frequencies against horizontal angle direction caused by phase difference as shown in FIG. 17. The series of storage 122-1 through 122-5 store peak levels P11 through P1n of relative amplitude value in the same beat frequency corresponding to each of the antenna scanning angle θ1 to θn within the predetermined angular range α to β, for instance, in the case of the accumulation series 122-1. And, as to the series of patterns of frequency spectrum peak value against these antenna scanning angles, like the valley judgment unit 72 in the embodiment shown in FIG. 4, a valley section is judged if the level of the section between two peaks is significantly lower than the levels of the peak sections, or by means of differentiation of the series of storage patterns, and judgment is made that the target is present in the antenna angle direction of the peak sections located at the both sides of the valley section, and eventually distance and relative speed will be acquired for every target.

Figure 19:
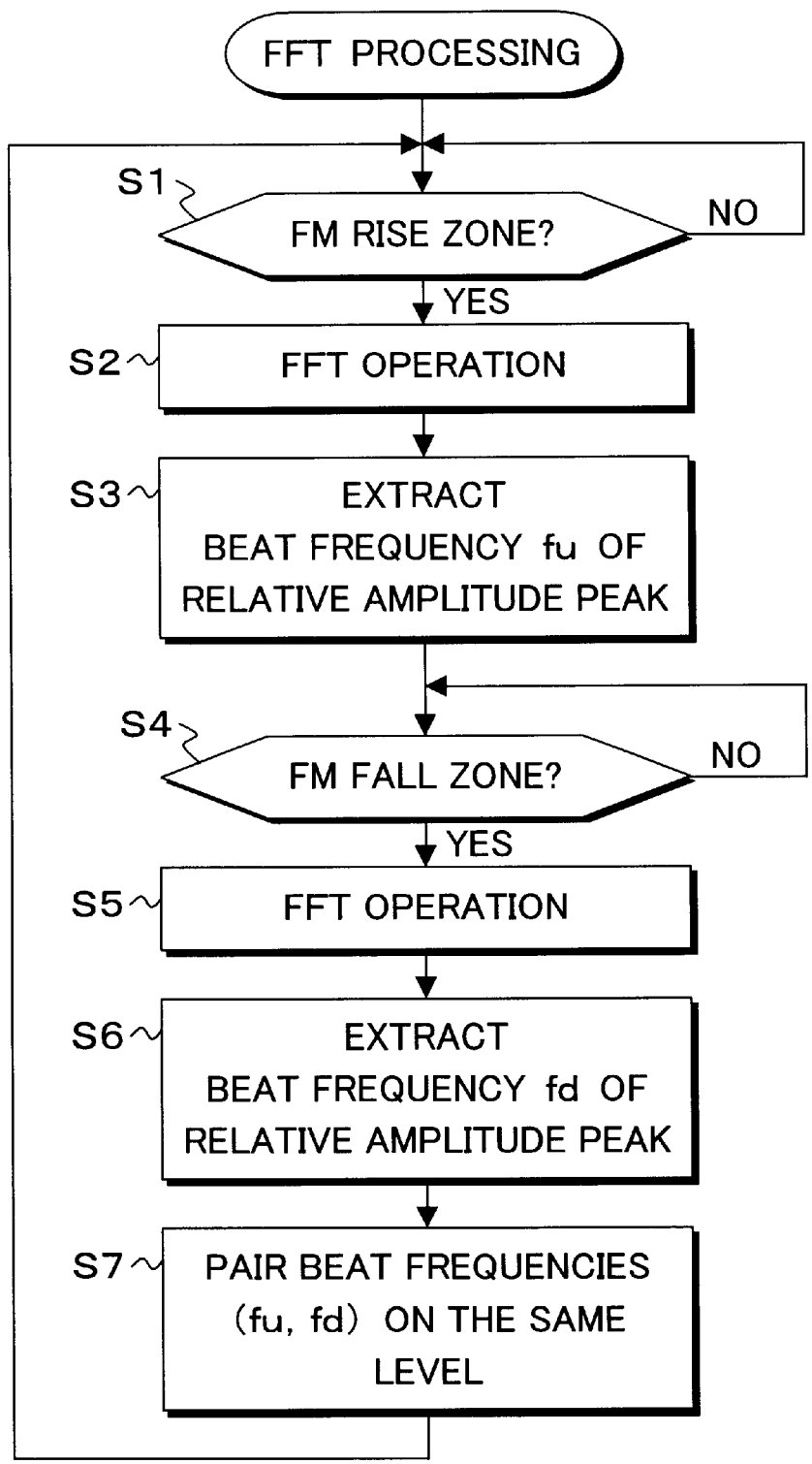
FIG. 19 is a flowchart of FFT processing shown in FIG. 13.
Figure 20:
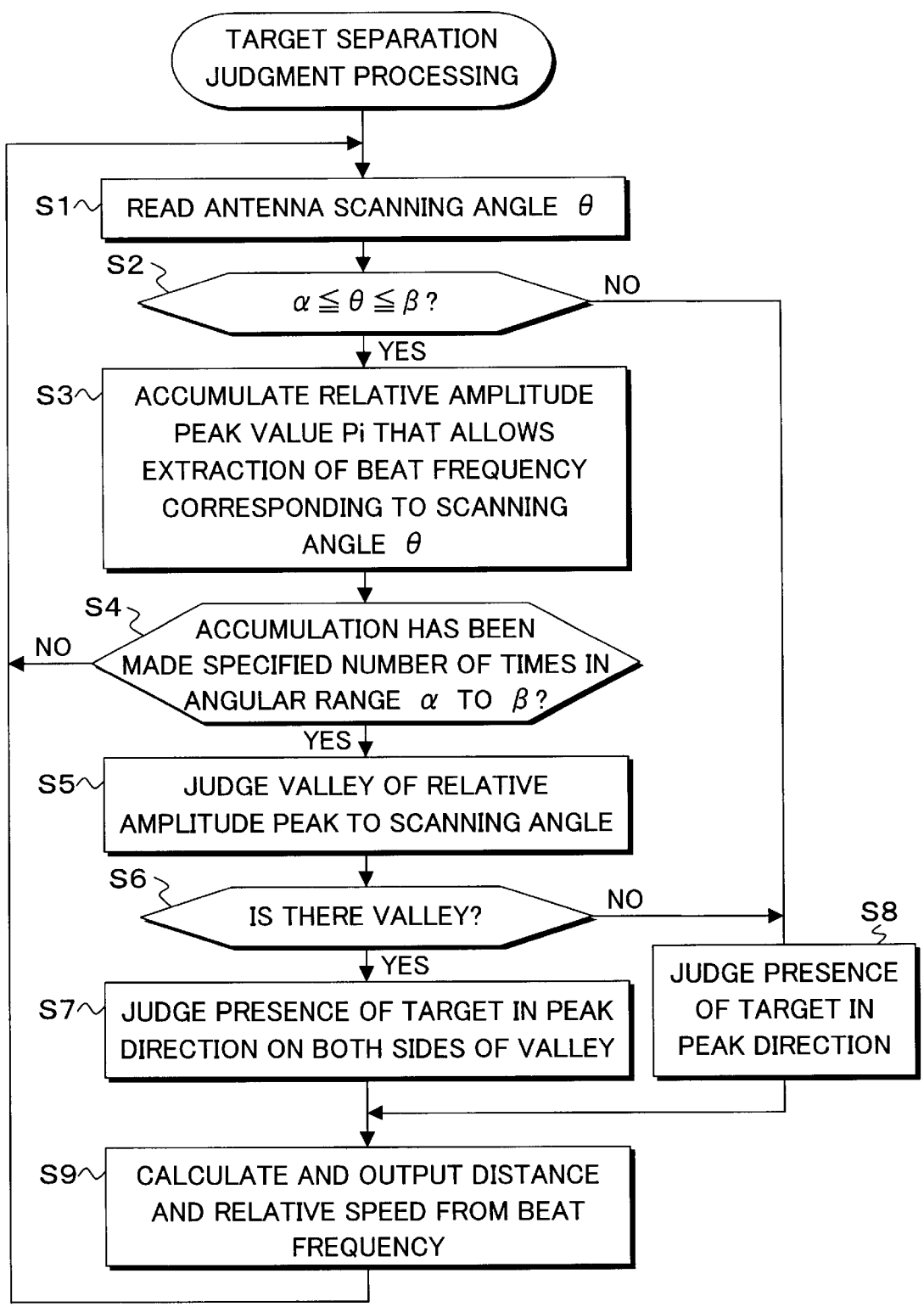
FIG. 20 is a flowchart of target separation judgment processing accompanied by accumulation and valley judgment associated with antenna scanning shown in FIG. 13.

FIG. 19 is a flowchart of FFT processing in the embodiment shown in FIG. 13, and FIG. 20 is a flowchart of processing at the side of the target separation/judgment unit 95 shown in FIG. 13. Either of the flowcharts embodies a program to be executed by the DSP 16 shown in FIG. 12. FFT processing shown in FIG. 19 shows a case of simple processing without including target separation/judgment processing shown in FIG. 4, and in this processing, after the FM rise zone is judged at the step S1, FFT operation is performed at the step S2, and the beat frequency fu corresponding to the peak level of the frequency spectrum pattern is extracted at the step S3. Then at the step S4, the FM fall zone is recognized and at the step S5, FFT operation is performed, and the beat frequency fd corresponding to the peak level of the frequency spectrum pattern is extracted. And at the step S7, with regard to the beat frequency fu of the FM rise zone and the beat frequency fd of the FM fall zone, if a plurality of the fu's and fd's are acquired, the beat frequencies that are on the same level are paired and outputted.

In target separation/judgment processing shown in FIG. 20, the antenna scanning angle θ is read-in at the step S1, and at the step S2, whether or not the scanning angle is within the range of α to β, applicable to judgment processing is checked. If the scanning angle is within the range, at the step S3, the peak value pi of relative amplitude to be the frequency spectral value used for extracting beat frequency corresponding to the antenna scanning angle θi is accumulated. Next at the step S4, whether the number of scanning times of the angular range α to β is as predetermined number of times, for instance 5 times or not is checked. If the number of scanning times is not 5 times, processing is repeated again from the step S1. When the number of scanning times reaches the set number of times at the step S4, processing goes on to step S5, and valley sections are judged as to the patterns of relative amplitude peaks against the accumulated scanning angles. When the valley section is judged at the step S6, judgment is made at the step S7, that the target is present in the peak directions on the both sides of the valley. If the valley section cannot be judged, the presence of the target in a single peak direction is judged at the step S8. And in either case, at the step S9, with regard to the judged target direction, distance and relative speed is calculated from the beat frequency and outputted. Also at the step S2, when the antenna scanning angle is out of the angular range for performing target separation/judgment, immediately at the step S8, judgment is made that the target is present in the peak direction at that time, and at the step S9, distance and relative speed as to one target is calculated from the beat frequency and outputted. Thus, the separation of the targets when two targets are present at the same distance viewed from the antenna can be made securely, and for instance, in the case when the own vehicle is running on the center lane of three lanes, and other vehicles are running on the lanes at the both sides of the center lane, with the same distance, or in the case when target separation/judgment under the present invention is not performed, an erroneous judgment can be made that a single target is present in the front of the own lane depending on phase difference, and when the own. vehicle is getting closer to the apparent target, the single target is suddenly separated into two targets running on the two lanes located at the both sides of the center lane, leading up to an erroneous judgment by the presence of a ghost, however, such an unusual judgment of targets can be securely prevented, when the own vehicle is running on the center lane of three lanes as described above.

Figure 21:
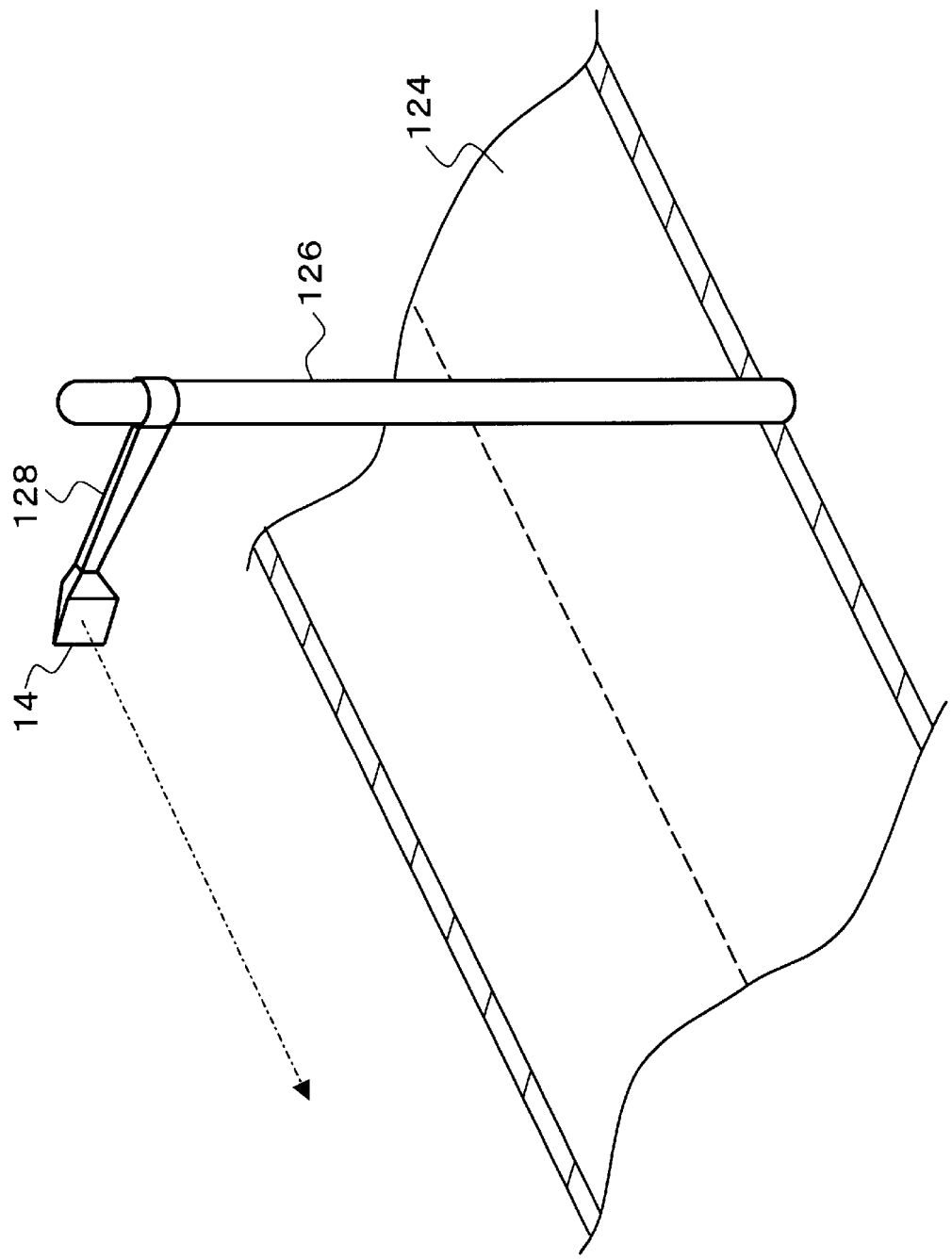
FIG. 21 illustrates the FM-CW radar apparatus of the present invention fixed to a road.

FIG. 21 illustrates how to fix and install the FM-CW radar apparatus under the present invention to a structure. A pole 126 is installed to the road shoulder of a road 124, and to the top of the pole 126, a support arm is secured facing to the side of the road 124, and the antenna unit 14 for the FM-CW radar apparatus under the present invention is installed to the leading end of the support arm 128. By the installation of the antenna unit 14, information concerning the vehicle running on the road 124 is measured. When the antenna unit 14 is fixed and installed to such a structure, the position of the antenna unit 14 will not be changed by vibration while the vehicle is running, unlike the antenna mounted on the vehicle, and phase relation of the received waves acquired as to a plurality of targets is fixed. Therefore, even in the state, in which two targets 82 and 84 are present in the same direction and in proximity viewed from the antenna unit 14, only either one of the fixed patterns shown in FIG. 7 will be produced. Because of this, even a functional configuration for separating and evaluating targets is provided as shown in FIG. 4, separation/judgment of targets by fluctuations in peak patterns caused by phase changing at random cannot be made. So, in the case when the antenna unit 14 is securely installed as shown in FIG. 21, an antenna drive mechanism as shown in FIG. 22 is provided, and random fluctuation is to be created in phase against received wave by means of forcibly moving the antenna unit 14 in asynchronous with the antenna scanning.

Figure 22:
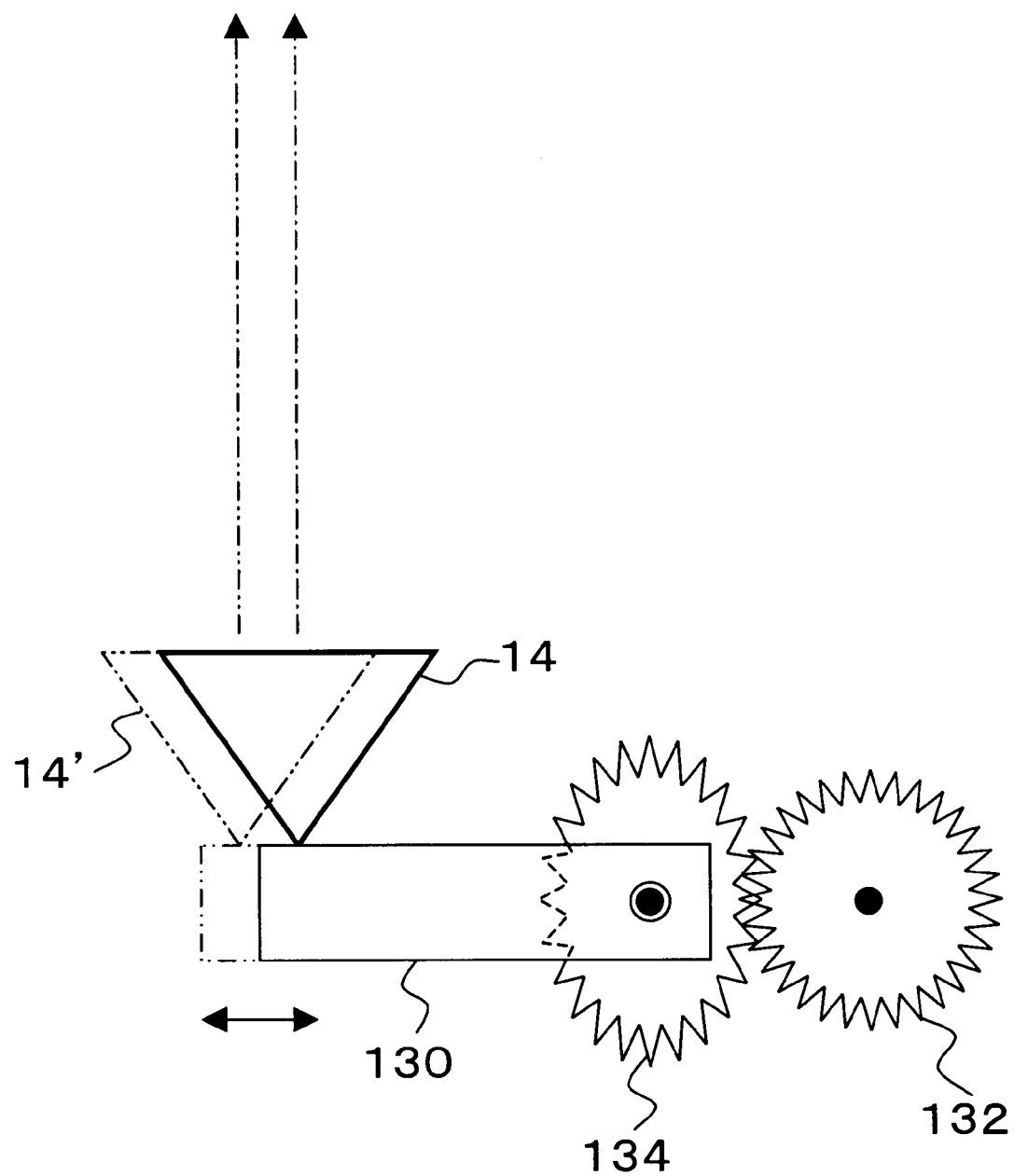
FIG. 22 illustrates antenna-driving mechanism shown in FIG. 21.

The antenna drive mechanism shown in FIG. 22 secures the antenna unit 14 to a slider 130 that travels freely in a horizontal direction crossing the antenna directing direction at a right angle. The right-hand side of the slider 130 is inserted into the shaft of an oval gear 134 in loose state. With the oval gear 134, a motor driven drive gear 132 engages. When the drive gear 132 is turned, the oval gear 134 turns along with the drive gear, and the slider 130 performs to-and-fro movements as shown by the arrow, corresponding to the change in the radius of the oval gear 134, because while the drive gear 132 turns in fixed position, the oval gear 134 is allowed to travel relatively. Because of this mechanism, the antenna unit 14 secured to the slider 130 travels in a horizontal direction within the range of 14', and by the travel of the antenna, phase of the received wave from the target changes forcibly. Therefore, even if the antenna unit 14 is securely installed as shown in FIG. 21, the level of the valley section 86 between the two peak sections 88 and 90 as shown in FIG. 7 changes at random because of the variations of phase caused by forcible move of the antenna, thereby allowing a target separation/judgment function shown in FIG. 4 to function effectively. As to the range, in which the antenna unit 14 should be moved, it is preferable to move the antenna in the range of some millimeters, corresponding to the wavelength of millimeter wave, like use frequency band of 76 GHz. As a matter of course, a drive mechanism for forcibly creating phase variation is not limited to the drive mechanism using the oval gear 134 shown in FIG. 22, but appropriate mechanism of reciprocating motion can be used.

As described above, according to the present invention, as to a plurality of targets present in a narrow range of distance that can cause interference by phase difference viewed from the antenna, resolving power in separation can be substantially improved. Also, the performance of target separation/judgment can be enhanced, only by signal processing in the DSP, and by the use of millimeter wave frequency band, such as 76 GHz, resolving power in separation can be substantially improved, leaving the front-end as it is, without the need to develop the antenna millimeter wave circuit section, that is hard-to-improve, thereby leading up to the possibility of substantial reduction in cost burden.

The above embodiment takes an example of a motor-vehicle mounting type, as the FM-CW radar apparatus for mounting on the mobile body, but, in addition to this usage, the FM-CW radar apparatus under the present invention can be used as a wharfing apparatus for ships or a collision prevention apparatus, to be mounted on ships.

The present invention covers appropriate variants that will not impair its objects and advantages. Further, the present invention is not restricted by the numerical values indicated in the above embodiment.

What is claimed is:

1. A radar apparatus comprising:
    a sending/receiving unit having an antenna and sending from the antenna a sending signal that has been frequency modulated by a triangular wave signal, the sending/receiving unit mixing a signal received from the antenna and a local signal branched off from the sending signal to generate a beat signal;
    a frequency analyzing unit analyzing the frequency of the beat signal for each rise zone and each fall zone of the frequency modulated by the triangular wave signal;
    an accumulation unit accumulating a plurality of frequency power spectra by frequency analysis at least for each rise zone;
    a judgment unit judging the presence of a valley section within a peak section, as a characteristic section from the plurality of frequency power spectra accumulated in the accumulation unit;
    a peak frequency extraction unit acquiring, as beat frequencies of different targets, respective beat frequencies of peak sections located at both sides of the characteristic section judged by the judgment unit; and
    an operation unit calculating the distance to a target and the relative speed thereto, based on the beat frequencies.

2. The radar apparatus according to claim 1, wherein the accumulation unit, the judgment unit, and the peak frequency extraction unit process both the rise zone and the fall zone.

3. A signal processing method of an FM-CW radar, the method comprising:
    sending from an antenna a sending signal that has been frequency modulated by a triangular wave signal, and mixing a signal received from the antenna and a local signal branched off from the sending signal to generate a beat signal;
    analyzing the frequency of the beat signal for each rise zone and each fall zone of the frequency modulated by the triangular wave signal;
    accumulating a plurality of frequency power spectra by analyzing the frequency at least for each rise zone;
    judging the presence of a valley section within a peak section, as a characteristic section from the plurality of frequency power spectra accumulated;
    acquiring, as beat frequencies of different targets, respective beat frequencies of peak sections located at both sides of the characteristic section; and
    calculating the distance to a target and the relative speed thereto, based on the beat frequencies.

4. A program controlling a computer mounted on a radar apparatus to execute a process of:
    inputting a beat signal acquired by sending from an antenna a sending signal that has been frequency modulated by a triangular wave signal, and by mixing a signal received from the antenna and a local signal branched off from the sending signal, and analyzing the frequency of the beat signal for each rise zone and each fall zone of the frequency modulated by the triangular wave signal;
    accumulating a plurality of frequency power spectra by analyzing the frequency at least for each rise zone;

judging the presence of a valley section within a peak section, as a characteristic section from the plurality of frequency power spectra accumulated;

acquiring, as beat frequencies of different targets, respective beat frequencies of peak sections located at both sides of the characteristic section; and calculating the distance to a target and the relative speed thereto, based on the] beat frequencies.

5. A radar apparatus comprising:

an antenna that is mechanically scanned within a predetermined angular range;

a sending/receiving unit sending from the antenna a sending signal that has been frequency modulated by a sending triangular wave signal, the sending/receiving unit mixing a signal received from the antenna and a local signal branched off from the sending signal to generate a beat signal;

a frequency analyzing unit analyzing the frequency of the beat signal for each rise zone and each fall zone of the frequency modulated by the triangular wave signal;

an accumulation unit accumulating a plurality of changes in spectral value of a specific beat frequency acquired by the frequency analyzing unit, corresponding to changes in the antenna scanning angle, for each different antenna scanning angle within a predetermined angular range;

a judgment unit judging a characteristic section from changes in spectral value corresponding to a plurality of antenna scanning angles accumulated in the accumulation unit;

a peak frequency extraction unit acquiring, as beat frequencies of targets present in different directions of scanning angle, spectral values of peak sections located at both sides of the characteristic section judged by the judgment unit; and an operation unit calculating the distance to a target and the relative speed thereto correlated with the antenna angle, based on the beat frequencies.

6. The apparatus according to claim 5, wherein the frequency analyzing unit further comprises:

a second accumulation unit accumulating a plurality of frequency spectra by analyzing the frequency at least for each rise zone;

a second judgment unit judging a characteristic section from the plurality of frequency spectra accumulated in the second accumulation unit; and a second peak frequency extraction unit acquiring, as beat frequencies of different targets, respective beat frequencies of peak sections located at both sides of the characteristic section judged by the second judgment unit.

7. The apparatus according to claim 6, wherein the second accumulation unit, the second judgment unit, and the second peak frequency extraction unit process both the rise zone and the fall zone.

8. A program controlling a computer mounted on an FM-CW radar to execute a process of:

inputting a beat signal acquired by sending a sending signal that has been frequency modulated by a triangular wave signal, from an antenna that is mechanically scanned within a predetermined angular range, and by mixing a signal received from the antenna and a local signal branched off from the sending signal, and analyzing the frequency of the beat signal for each rise zone and each fall zone of the frequency modulated by the triangular wave signal;

accumulating a plurality of changes in spectral value of a specific beat frequency acquired by the frequency analysis, corresponding to changes in the antenna scanning angle, for each different antenna scanning angle within a predetermined angular range;

judging a characteristic section from the accumulated changes in spectral value corresponding to a plurality of antenna scanning angles;

acquiring, as beat frequencies of targets present in different directions of scanning angle, spectral values of peak sections located at both sides of the characteristic section; and calculating the distance to a target and the relative speed thereto correlated with the antenna angle, based on the beat frequencies.

9. A radar apparatus comprising:

an antenna securely installed on a structure;

a sending/receiving unit having an antenna and sending from the antenna a sending signal that has been frequency modulated by a triangular wave signal, the sending/receiving unit mixing a signal received from the antenna and a local signal branched off from the sending signal to generate a beat signal;

a frequency analyzing unit analyzing the frequency of the beat signal for each rise zone and each fall zone of the frequency modulated by the triangular wave signal;

an accumulation unit accumulating a plurality of frequency spectra by frequency analysis at least for each rise zone;

a judgment unit judging a characteristic section from the plurality of frequency spectra accumulated in the accumulation unit;

a peak frequency extraction unit acquiring, as beat frequencies of different targets, respective beat frequencies of peak sections located at both sides of the characteristic section judged by the judgment unit;

an operation unit calculating the distance to a target and the relative speed thereto, based on the beat frequencies; and an antenna drive unit periodically moving the installation position of the antenna within a specified range conforming to the wavelength used.

10. The apparatus according to claim 9, wherein the accumulation unit, the judgment unit, and the peak frequency extraction unit process both the rise zone and the fall zone.

* * * * *

UNITED STATES PATENT AND TRADEMARK OFFICE
CERTIFICATE OF CORRECTION

PATENT NO.     : 6,657,582 B2                                           Page 1 of 1
DATED          : December 2, 2003
INVENTOR(S)    : Tetsuo Seki et al.

It is certified that error appears in the above-identified patent and that said Letters Patent is hereby corrected as shown below:

<u>Column 19,</u>
Line 19, please delete -- ] --.

Signed and Sealed this

First Day of June, 2004

JON W. DUDAS
*Acting Director of the United States Patent and Trademark Office*